United States Patent [19]

Furuhashi et al.

[11] 4,274,142
[45] Jun. 16, 1981

[54] APPARATUS FOR DETECTING REVOLUTIONS OF AN INTERNAL COMBUSTION ENGINE

[75] Inventors: Toshio Furuhashi; Osamu Abe; Kotaro Hirasawa; Masumi Imai, all of Ibaraki, Japan

[73] Assignee: Hitachi, Ltd., Tokyo, Japan

[21] Appl. No.: 64,431

[22] Filed: Aug. 7, 1979

[30] Foreign Application Priority Data

Aug. 7, 1978 [JP] Japan .................... 53-95482

[51] Int. Cl.³ .................. G01P 3/488; G01R 23/02
[52] U.S. Cl. .................. 364/465; 324/166; 324/169
[58] Field of Search ........... 364/431, 565; 324/78 R, 324/78 D, 166–173; 340/347 NT

[56] References Cited

U.S. PATENT DOCUMENTS

| | | | |
|---|---|---|---|
| 3,525,044 | 8/1970 | Richmond | 324/173 |
| 3,553,728 | 1/1971 | Frank | 324/78 D |
| 3,917,927 | 11/1975 | Minton | 324/78 D X |
| 3,968,434 | 7/1976 | Dixon et al. | 364/565 X |
| 4,107,600 | 8/1978 | McMannis | 324/78 R |
| 4,190,823 | 2/1980 | Leichle | 340/347 NT |

OTHER PUBLICATIONS

Binder et al., Car Control by a Central Electronic System, SAE Paper 770001 (1977), pp. 1–7.

*Primary Examiner*—Felix D. Gruber
*Attorney, Agent, or Firm*—Craig and Antonelli

[57] ABSTRACT

In a detecting apparatus for indicating engine revolutions or vehicle speed, a counter is provided to count up, for a predetermined period of time, the number of pulses produced by an angle sensor. To improve the accuracy of the measurement, the time width during which the pulses are counted can be varied in accordance with a rotational speed of the engine. In this way, a larger measurement time period is provided at lower speeds than at higher speeds.

37 Claims, 30 Drawing Figures

FIG. 6

| STAGE PULSE | STAGE CTR ||||||||||
|---|---|---|---|---|---|---|---|---|---|---|
| | $C_9$ | $C_8$ | $C_7$ | $C_6$ | $C_5$ | $C_4$ | $C_3$ | $C_2$ | $C_1$ | $C_0$ |
| INTL-P | X | X | X | X | X | X | X | 0 | 0 | 1 |
| CYL-P | X | X | X | X | X | X | X | 0 | 1 | 0 |
| ADV-P | X | X | X | X | X | X | X | 0 | 1 | 1 |
| DWL-P | X | X | X | X | X | X | X | 1 | 0 | 0 |
| RPM-P | X | X | X | X | X | X | X | 1 | 0 | 1 |
| VSP-P | X | X | X | X | X | X | X | 1 | 1 | 0 |
| RPMW-P | X | X | X | 0 | 0 | 1 | 0 | 0 | 0 | 0 |
| EGRP-P | X | X | 0 | 0 | 1 | 1 | 0 | 0 | 0 | 0 |
| EGRD-P | X | X | 1 | 0 | 1 | 1 | 0 | 0 | 0 | 0 |
| NIDLP-P | X | X | 0 | 1 | 0 | 1 | 0 | 0 | 0 | 0 |
| NIDLD-P | X | X | 1 | 1 | 0 | 1 | 0 | 0 | 0 | 0 |
| ENST-P | 0 | 1 | 0 | 0 | 0 | 0 | 0 | 0 | 0 | 0 |
| VSPW-P | 1 | 0 | 0 | 0 | 0 | 0 | 0 | 0 | 0 | 0 |
| INTV-P | 1 | 1 | 0 | 0 | 0 | 0 | 0 | 0 | 0 | 0 |
| INTVR-P | 0 | 0 | 0 | 0 | 0 | 0 | 0 | 0 | 0 | 0 |
| INJ-P (IF TREG=000) | X | X | X | X | X | X | X | 1 | 1 | 1 |
| INJ-P (IF TREG=001) | X | X | X | X | X | X | 0 | 1 | 1 | 1 |
| INJ-P (IF TREG=010) | X | X | X | X | X | 0 | 0 | 1 | 1 | 1 |
| INJ-P (IF TREG=011) | X | X | X | X | 0 | 0 | 0 | 1 | 1 | 1 |
| INJ-P (IF TREG=100) | X | X | X | 0 | 0 | 0 | 0 | 1 | 1 | 1 |
| INJ-P (IF TREG=101) | X | X | 0 | 0 | 0 | 0 | 0 | 1 | 1 | 1 |
| STAGE0-P | X | X | X | X | X | X | X | 0 | 0 | 0 |
| STAGE7-P | X | X | X | X | X | X | X | 1 | 1 | 1 |

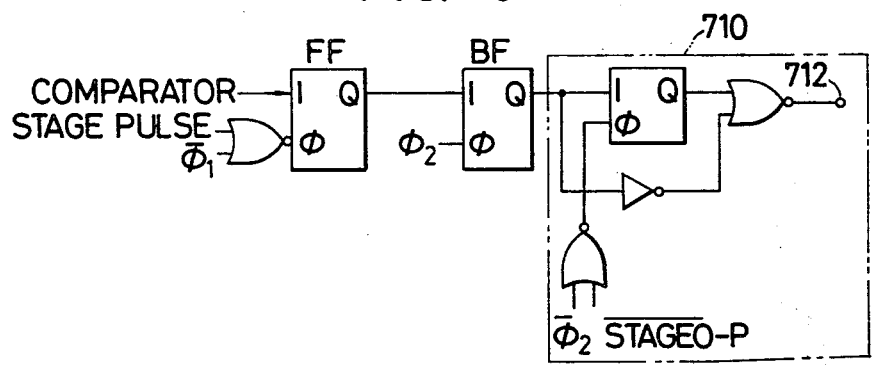
FIG. 18
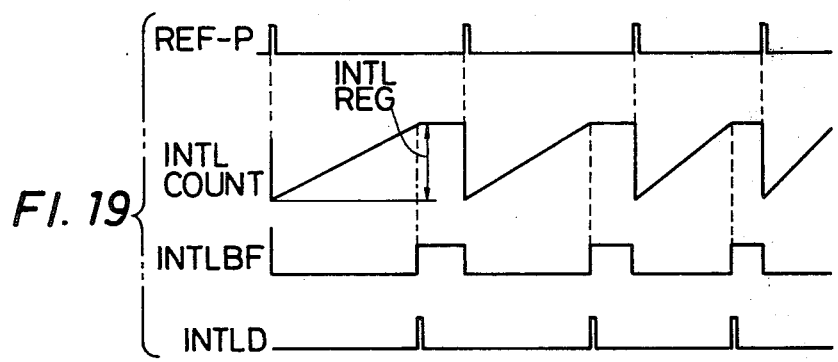
FI. 19
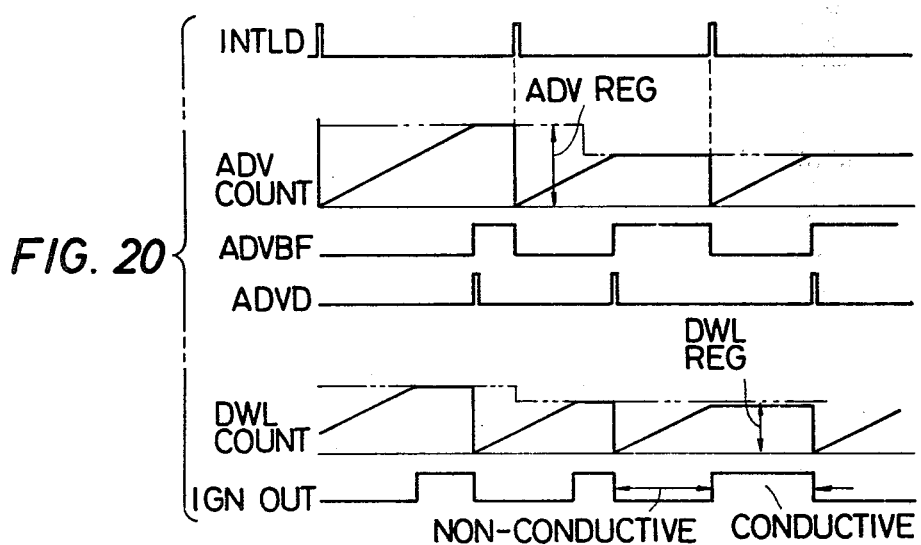
FIG. 20

APPARATUS FOR DETECTING REVOLUTIONS OF AN INTERNAL COMBUSTION ENGINE

CROSS REFERENCE TO RELATED APPLICATIONS

The present application relates to subject matter disclosed in the applications of the group listed below.

U.S. Ser. No. 943,930; Filed: Sept. 20, 1978; H. Tokuda et al
U.S. Ser. No. 951,509; Filed: Oct. 16, 1978; S. Morinaga et al
U.S. Ser. No. 952,275; Filed: Oct. 18, 1978; M. Takato et al
U.S. Ser. No. 952,276; Filed: Oct. 18, 1978; H. Tokuda et al
U.S. Ser. No. 952,279; Filed: Oct. 18, 1978; H. Tokuda et al
U.S. Ser. No. 952,326; Filed: Oct. 18, 1978; M. Imai et al
U.S. Ser. No. 952,531; Filed: Oct. 18, 1978; M. Imai et al
U.S. Ser. No. 952,532; Filed: Oct. 18, 1978; H. Tokuda et al
U.S. Ser. No. 952,533; Filed: Oct. 18, 1978; M. Imai et al
U.S. Ser. No. 011,845; Filed: Feb. 13, 1979; T. Furuhashi et al
U.S. Ser. No. 059,029; Filed: July 19, 1979; S. Obara et al
U.S. Ser. No. 060,751; Filed: July 26, 1979; T. Furuhashi et al
U.S. Ser. No. 073,085; Filed: Sept. 6, 1979; M. Imai et al

BACKGROUND OF THE INVENTION

This invention relates to an apparatus for the control of an internal combustion engine and, more particularly, to an apparatus for detecting revolutions of the engine.

In recent years, much effort has been made for decreasing the emission of pollutants. Unfortunately, countermeasures against the emission of exhaust gases have, in many cases, resulted in lowering the conversion efficiency of heat energy, released by the combustion of fuel, into mechanical energy, so that larger amounts of fuel have become necessary for automobile operation.

In order to attain a high conversion efficiency from heat energy to mechanical energy and the low emission of pollutants at the same time, electronic controls have been developed using a digital processing unit.

In such a digital engine control, the number of revolutions of the engine is important input data together with the flow rate of air supplied into a combustion chamber. In other words, the extent of the precision of such input data has a large amount of influence on the engine control performance. The number of revolutions of the engine ranges from less than 100 r.p.m. during low speed cranking to as much as 6000 r.p.m. or more at high speeds. The revolutions N can be obtained by counting, during a certain period of time, pulses generated by a crank angle sensor. It is now assumed the crank angle sensor is designed to generate a pulse each time the engine rotates 0.5 degrees of the crank angle and that the measurement time width is a fixed value $TW_o$. It is also supposed that the number of revolutions to be measured is in the range of 0 through 6400 r.p.m. since revolutions of more than about 6000 r.p.m. are generally considered to lie in a dangerous region. If the measurement data is indicated as a digital signal of $2^{10}$ bits, then the time duration $TW_o$ (m sec) is given by the following equation.

$$6400 = \frac{2^{10} \times 0.5}{360°} \times \frac{1000}{TW_0} \times 60$$

$$\therefore TW_0 = \frac{40}{3} \approx 13.333 \text{ (m sec)}$$

Thus, if P angle pulses are sensed in the time duration of about 13 (m sec), the number N of revolutions is given by the following equation.

$$N = 25/4 P \text{(r.p.m.)}$$

The resolution of the revolution number input value in this case is 25/4 (r.p.m.) per digit. Since an error of ±1 digit at the maximum can exist in the measured value, the relative error (%) to the number N of revolutions is expressed as follows.

$$\epsilon = 25/4N \times 100 \text{(\%)}$$

As a result, as N becomes smaller, the error increases sharply. As is well known, the fuel injection time $T_p$ is expressed in a manner to vary in dependence upon the number N of the engine revolutions. Therefore, it is very important for the precision of engine control to accurately measure the engine revolutions.

SUMMARY OF THE INVENTION

One object of the present invention resides in providing an apparatus for measuring at high precision the number of engine revolutions.

Another object of the invention is to provide an apparatus for measuring engine revolutions which is suitable for use with a digital type electronic engine control system.

In order to achieve the objects mentioned above, the apparatus according to the present invention is provided with a counter means which counts up pulses produced by an angle sensor in a predetermined time duration, and means for varying the time duration during which the sensed pulses are counted, in accordance with the rotational speed of the engine.

Other objects and features of the present invention will become more apparent from the following detailed description of the invention when read in conjunction with the accompanying drawings.

BRIEF DESCRIPTION OF THE DRAWINGS

FIG. 6 is a table showing the relation between stage pulses and the contents of a stage counter;

FIG. 10 shows a schematic diagram of an output register group of the input/output unit;

FIG. 18 shows a diagram of an output logic circuit;

FIGS. 19, 20, 21, 22, 28 and 29 show waveforms for explanation of the operation of the engine control apparatus;

DETAILED DESCRIPTION OF THE PREFERRED EMBODIMENTS

Figure 1:
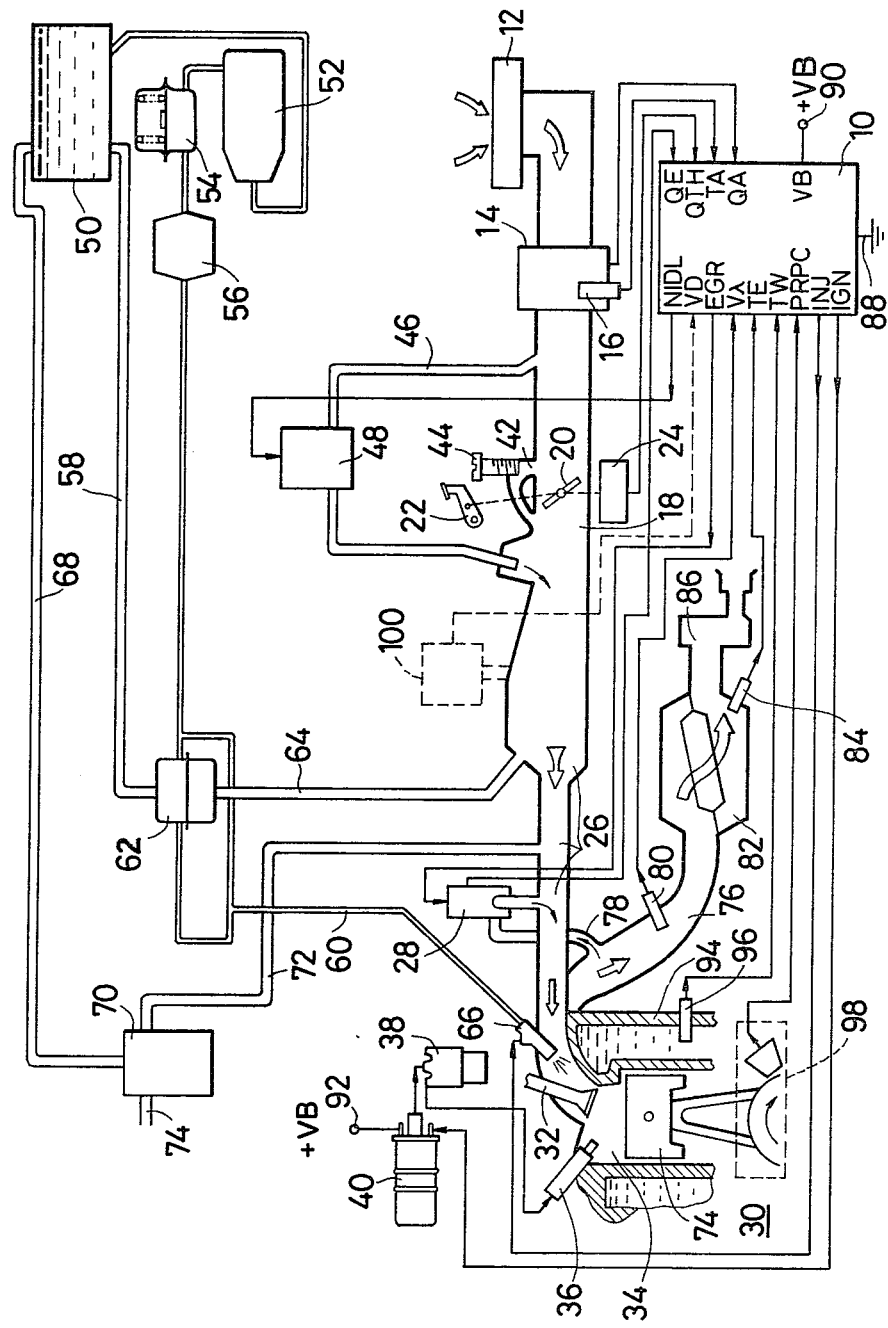
FIG. 1 is a diagram showing an engine control system for a fuel-injected, internal combustion engine.

An embodiment of this invention will now be described with reference to FIG. 1 showing a system diagram of an electronic engine control apparatus. Air taken in through an air cleaner 12 has its flow rate measured by an air flow meter 14, from which an output signal QA representative of the quantity of flow of the air is supplied to a control circuit 10. The air flow meter 14 is provided with a temperature sensor 16 for detecting the temperature of the suction air, and an output signal TA representative of the temperature of the suction air is also supplied into the control circuit 10.

The air having passed through the air flow meter 14 passes through a throttle chamber 18, and is sucked from an intake manifold 26 through a suction valve 32 into a combustion chamber 34 of an engine 30. The quantity of air to be sucked into the combustion chamber 34 is controlled by varying the degree opening of a throttle valve 20 disposed within a throttle chamber in mechanical connection with an accelerator pedal 22. The angular position of the throttle valve 20 is detected by a throttle position detector 24. A signal QTH representative of the position of the throttle valve 20 is supplied by the throttle position detector 24 to the control circuit 10.

The throttle chamber 18 is provided with a bypass passage 42 for idling and an idle adjust screw 44 for adjusting the quantity of air to pass through the bypass passage 42. Where the engine is operating in the idling state, the throttle valve 20 is fully closed. The suction air from the air flow meter 14 flows through the bypass passage 42, and is sucked into the combustion chamber 34. Accordingly, the quantity of suction air in the idling operation state is varied by the adjustment of the idle adjustment screw 44. Since energy to be generated in combustion chamber 34 is substantially determined by the quantity of air from the bypass passage 42, the engine revolution velocity in the idling state can be adjusted to an appropriate value by adjusting the idle adjustment screw 44, thus varying the quantity of suction air into the engine.

The throttle chamber 18 is further provided with another bypass passage 46 and an air regulator 48. The air regulator 48 controls the quantity of air to pass through the passage 46 in response to an output signal NIDL from control circuit 10, to control the engine revolution velocity during engine warm-up and the supply of an appropriate quantity of air to the engine for a sudden change of the throttle valve 20. If necessary, the flow rate of air during the idling operation can also be varied.

Now, the fuel feed system will be described. Fuel stored in a fuel tank 50 is drawn into a fuel pump 52, and is fed under pressure to a fuel damper 54. The fuel damper 54 absorbs the pressure pulsation of the fuel from the fuel pump 52 so as to feed fuel of a predetermined pressure to a fuel pressure regulator 62 through a fuel filter 56. The fuel from the fuel pressure regulator 62 is fed under pressure to a fuel injector 66 through a fuel pipe 60. In response to an output signal INJ from the control circuit 10, the fuel injector 66 is opened to inject the fuel into the engine.

The quantity of fuel injected from the fuel injector 66 is determined by the valve opening time of the injector 66 and the difference between the pressure of the fuel fed under pressure to the injector 66 and the pressure of the intake manifold 26 into which the fuel is injected. It is desirable, however, that the quantity of fuel injection from the fuel injector 66 depend only on the valve opening time which is determined by the signal from the control circuit 10. Therefore, the pressure of the fuel feed to the fuel injector 66 is controlled by the fuel pressure regulator 62 so that the difference between the fuel pressure to the fuel injector 66 and the manifold pressure of the intake manifold 26 may be constant at all times. The intake manifold pressure is coupled to the fuel pressure regulator 62 through a pressure conduit 64. When the fuel pressure in the fuel pipe 60 becomes a certain value higher than this intake manifold pressure, the fuel pipe 60 and a fuel return pipe 58 communicate with each other, and fuel corresponding to the excess pressure is returned to the fuel tank 50 through the fuel return pipe 58. In this way, the difference between the fuel pressure in the fuel pipe 60 and the manifold pressure in the intake manifold 26 is always held constant.

The fuel tank 50 is further provided with a pipe 68 and a canister 70 for absorbing gases with the vaporized fuel. During the operation of the engine, air is drawn in from an atmospheric air port 74, and the absorbed fuel gas is fed to the intake manifold 26 by a pipe 72 and then to the engine 30.

As explained above, fuel is injected from the fuel injector 66, and the suction valve 32 is opened in synchronism with the motion of a piston 74, so that a mixture consisting of the air and the fuel is led to the combustion chamber 34. The mixture is compressed and is ignited by spark energy from an ignition plug 36, whereby the combustion energy of the mixture is converted into kinetic energy for moving the piston.

The burnt mixture is emitted from an exhaust valve (not shown) through an exhaust pipe 76, a catalytic converter 82, and a muffler 86 to the atmosphere as exhaust gas. The exhaust pipe 76 is provided with an exhaust gas recirculation pipe 78 (hereinbelow abbreviated to EGR pipe), through which part of the exhaust gas is led to the intake manifold 26. That is, part of the exhaust gas is returned to the suction side of the engine. The quantity of recirculated gas is determined by the valve opening degree of an exhaust gas recirculator 28. The valve opening degree is controlled by an output signal EGR of the control circuit 10. Further, the valve position of the exhaust gas recirculator 28 is converted into an electric signal and is supplied to the control circuit 10 as a signal QE.

In the exhaust pipe 76, there is provided a so-called λ sensor 80, which detects the mixing ratio of the mixture sucked into the combustion chamber 34. As the λ sensor 80, an $O_2$ sensor (oxygen sensor) is ordinarily used, and it detects an oxygen concentration in the exhaust gas and generates a voltage $V_\lambda$ responsive to the oxygen concentration. The output $V_\lambda$ of the λ sensor 80 is supplied to the control circuit 10. The catalytic converter 82 is provided with an exhaust gas temperature sensor 84, the output signal TE of which corresponding to the exhaust gas temperature is supplied to the control circuit 10.

The control circuit 10 is coupled via a negative terminal 88 and a positive terminal 90 to a power source +VB. Further, a signal IGN for controlling the sparking of the foregoing ignition plug 36 is applied to the primary coil of an ignition coil 40 from the control circuit 10, and a high voltage generated in the secondary coil thereof is applied to the ignition plug 36 through a distributor 38, so that sparks for combustion are generated within the combustion chamber 34. More specifically, the ignition coil 40 is coupled via a positive terminal 92 to the power source and the control circuit 10 is provided with a power transistor (not shown) for controlling the primary coil current of the ignition coil 40. A series circuit consisting of the primary coil of the ignition coil 40 and the power transistor is formed between the positive power source terminal 92 of the ignition coil 40 and the negative power source terminal 88 of the control circuit 10. By rendering the power transistor conductive, electromagnetic energy is stored in the ignition coil 40, and by rendering the power transistor nonconductive, the electromagnetic energy is applied to the ignition plug 36 as energy having a high voltage.

The engine 30 is provided with a water temperature sensor 96, which detects the temperature of engine coolant 94, and a signal TW thus detected is applied to the control circuit 10. Further, the engine 30 is provided with an angle sensor 98 for detecting the rotational position of the engine. By means of the sensor 98, a reference signal PR is generated every 120°, for example, in synchronism with the rotation of the engine, and an angle signal PC is generated each time the engine is rotated by a predetermined angle (e.g. 0.5°). These signals PR and PC are supplied to the control circuit 10.

In the system of FIG. 1, a negative pressure sensor may be used instead of the air flow meter 14. A component 10 indicated by dotted lines in the figure is the negative sensor, from which a voltage VD corresponding to the negative pressure of the intake manifold 26 is produced and supplied to the control circuit 10.

As the negative pressure sensor 100, a semiconductor negative pressure sensor may be used in which the boost pressure of the intake manifold is caused to act on one side of a silicon chip, while the atmospheric pressure or a fixed pressure is caused to act on the other side. A vacuum may be used in some cases. With such a structure, the voltage VD corresponding to the manifold pressure is generated by the action of the piezo-resistive effect or a similar effect, and is applied to the control circuit 10.

Figure 2:
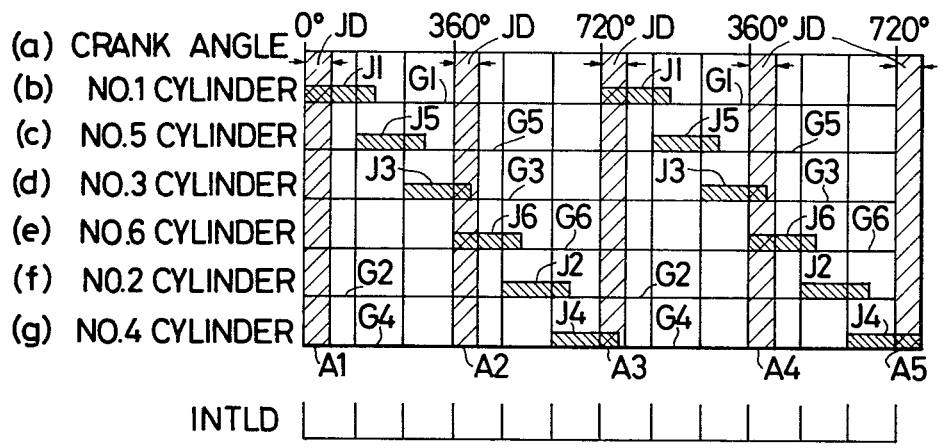
FIG. 2 shows timings of fuel injection and ignition with respect to crank angle.

FIG. 2 is an operational diagram for explaining the ignition timing and the fuel injection timing of a six-cylinder engine versus the crank angle. In FIG. 2, (a) represents the crank angle. The reference signal PR is provided from the angle sensor 98 for every 120° of the crank angle. That is, the reference signal PR is applied to the control circuit 10 every 0°, 120°, 240°, 360°, 480°, 600°, or 720° of the crank angle.

In FIG. 2, lines (b), (c), (d), (e), (f), and (g) illustrate the operations of the first cylinder, the fifth cylinder, the third cylinder, the sixth cylinder, the second cylinder, and the fourth cylinder, respectively. J1 through J6 represent the valve opening positions of the suction valves of the respective cylinders. As shown in FIG. 2, the valve opening positions of the respective cylinders are shifted by 120° in terms of the crank angle. Although the valve opening positions and the valve opening widths differ to some extent in dependence on each engine structure, they are substantially as indicated in the figure.

Reference symbols A1 through A5 in the figure indicate the valve opening timings or fuel injection timings of the fuel injector 66. The time width JD of each of the injection timings A1 through A5 represents the valve opening time of the fuel injector 66. The time width JD can be considered as representing the quantity of fuel injected from the fuel injector 66. The fuel injectors 66 are disposed in correspondence with the respective cylinders, and they are connected in parallel with a driver circuit within the control circuit 10. Accordingly, the fuel injectors 66 corresponding to the respective cylinders open the valves and inject fuel at each occurrence of the signal INJ from the control circuit 10.

Operation will now be explained with reference to the first cylinder illustrated in FIG. 2. In synchronism with the reference signal INTLD generated at 120° of the crank angle, (the relationship in timing between PR and INTLD will be explained later) output signal INJ is applied from the control circuit 10 to the fuel injectors 66 which are disposed at the manifolds or suction ports of the respective cylinders. Thus, fuel is injected as shown at A2 for the period of time JD calculated by the control circuit 10. Since, however, the first cylinder has its suction valve closed, the injected fuel is held near the suction port of the first cylinder and is not sucked into the cylinder. In response to the reference signal INTLD arising at the point 720° of the crank angle, the signal is sent from the control circuit to the fuel injectors 66 again, and the fuel injection shown at A3 is carried out. At substantially the same time as the injection, the suction valve of the first cylinder is opened. Upon this valve opening, both the fuel injected at A2 and the fuel injected at A3 are sucked into the combustion chamber. The same applies to the other cylinders. That is, in the fifth cylinder illustrated in (c), fuel quantities injected at A2 and A3 are sucked in at the valve opening position J5 of the suction valve. In the third cylinder illustrated in (d), part of the fuel injected at A2, the fuel injected at A3 and part of the injected fuel at A4 are sucked in at the valve opening position J3 of the suction valve. When the part of the fuel injected at A2 and the part of the fuel injected at A4 are put together, they become equal to the quantity of injection corresponding to one injecting operation. Also, in each suction stroke of the third cylinder, the quantity of injection corresponding to two injecting operations is sucked in. Likewise, in the sixth cylinder, second cylinder, or fourth cylinder illustrated at (e), (f), or (g), respectively, the quantity of injection corresponding to two injecting operations of the fuel injector is sucked in by one suction stroke.

As understood from the above explanation, the quantity of fuel injection assigned by the fuel injection signal INJ from the control circuit 10 is half the necessary fuel amount to be sucked in, and the necessary fuel amount corresponding to the air sucked into the combustion chamber 34 is obtained by two injecting operations of the fuel injector 66.

In FIG. 2, reference symbols G1 through G6 indicate ignition timings corresponding to the first cylinder through the sixth cylinder respectively. By rendering the poweer transistor disposed within the control circuit 10 nonconductive, the primary coil current of the ignition coil 40 is cut-off to generate the high voltage in the secondary coil. The generation of the high voltage is effected at the ignition timings G1, G5, G3, G6, G2, and G4, and power is distributed by the distributor 38 to the ignition plugs 36 disposed in the respective cylinders. Thus, the ignition plugs ignite in the order of the first cylinder, fifth cylinder, third cylinder, sixth cylinder, second cylinder, and fourth cylinder, and the mixture, consisting of the fuel and the air, burns.

CONTROL UNIT (10)

Figure 3:
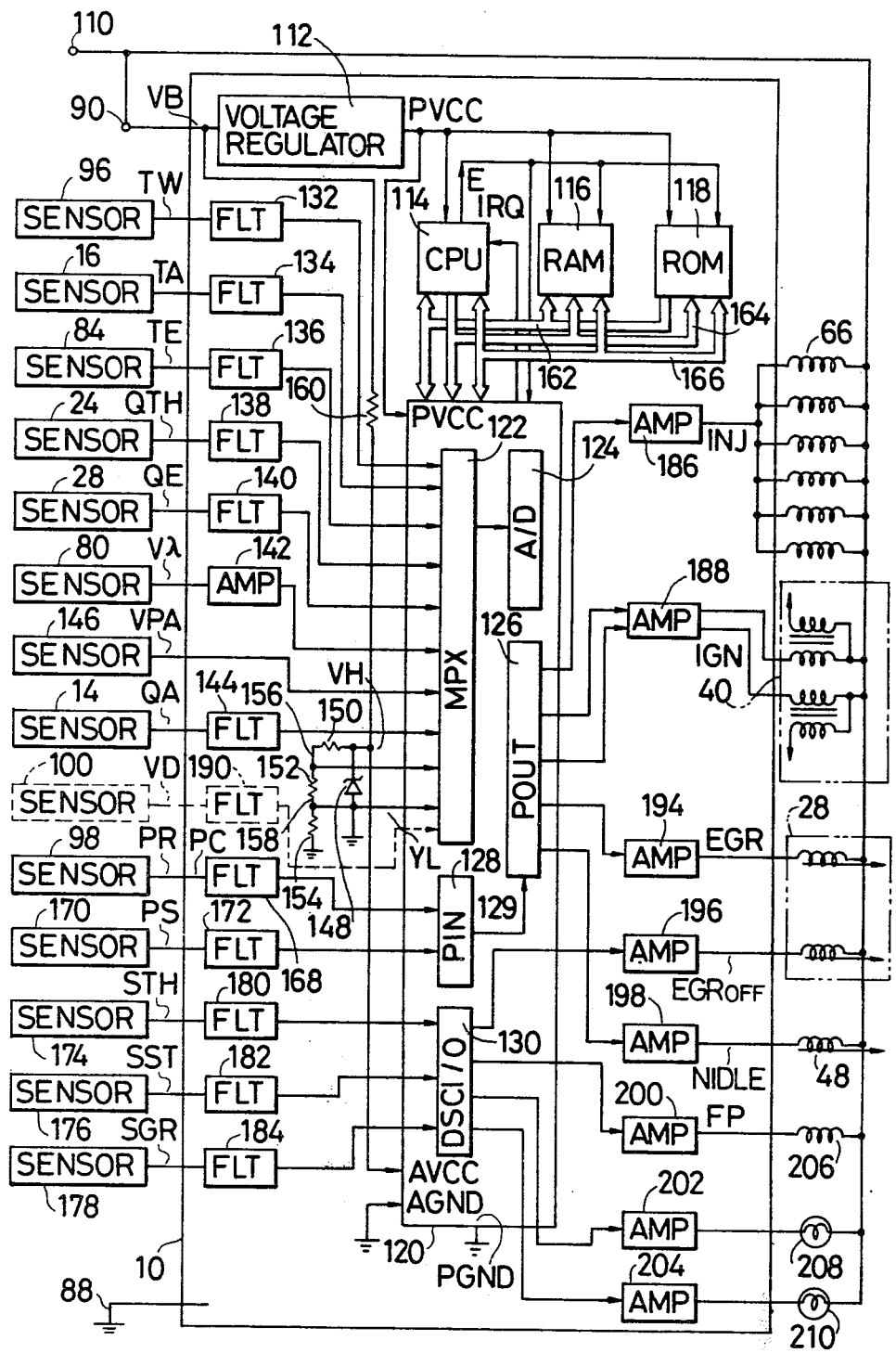
FIG. 3 is a block diagram showing a control unit of the engine control system shown in FIG. 1.

A detailed circuit arrangement of the control circuit 10 in FIG. 1 is shown in FIG. 3. The positive power source terminal 90 of the control circuit 10 is connected to a plus terminal 110 of a battery and a voltage VB is supplied to the control circuit 10. The supply voltage VB is held constant at a fixed voltage PVCC, e.g. 5 V, by a voltage regulator circuit 112. The fixed voltage PVCC is supplied to a central processor 114 (hereinbelow abbreviated as CPU), a random access memory 116 (hereinbelow abbreviated as RAM), and a read only memory 118 (hereinbelow abbreviated as ROM). Further, the output PVCC of the voltage regulator circuit 112 is applied to an input/output circuit 120.

The input/output circuit 120 has a multiplexer 122, an analog/digital converter 124, a pulse output circuit 126, a pulse input circuit 128, and a discrete input/output circuit 130.

Analog signals are applied to the multiplexer 122 from the various sensors. One of the input signals is selected on the basis of a command from the CPU 114, and is coupled via multiplexer 122 to analog-to-digital converter 124. The analog input signals include the analog signal TW representative of the temperature of the cooling water of the engine, the analog signal TA representative of the suction temperature, the analog signal TE representative of the exhaust gas temperature, the analog signal QTH representative of the throttle opening, the analog signal QE representative of the valve opening state of the exhaust gas recirculator, the analog signal $V_\lambda$ representative of the excess air ratio of the sucked mixture and the analog signal QA representative of the quantity of sucked air, the signals being derived from the sensors shown in FIG. 1, i.e. the water temperature sensor 96, the suction temperature sensor 16, the exhaust temperature sensor 84, the throttle position detector 24, the exhaust gas recirculator 28, the sensor 80 and the air-flow meter QA are applied to the multiplexer 122, through filters 132, 134, 136, 138, 140 and 144. The output $V_\lambda$ of the $\lambda$ sensor 80 is applied to the multiplexer through the amplifier 142 which includes a filter circuit.

In addition, an analog signal VPA representative of the atmospheric pressure is applied from an atmospheric pressure sensor 146 to the multiplexer 122. The voltage VB is supplied from the positive power source terminal 90 through a resistor 160 to a series circuit consisting of resistors 150, 152, and 154. Further, the terminal voltage of the series circuit composed of the resistors is kept constantby a zener diode 148. The values of voltages VH and VL at respective junctures 156 and 158 between the resistors 150 and 152 and the resistors 152 and 154 are applied to the multiplexer 122.

The CPU 114, RAM 116, ROM 118, and the input/output circuit 120 are respectively coupled to a data bus 162, an address bus 164, and a control bus 166. Further, an enabling signal E is applied from the CPU 114 to the RAM 116, the ROM 118, and the input/output circuit 120. In synchronism with the enabling signal E, the transmission of data through the data bus 162 is effected.

Signals representative of water temperature TW, suction air temperature TA, exhaust gas temperature TE, throttle opening QTH, quantity of exhaust gas recirculation QE, $\lambda$ sensor output $V_\lambda$, atmospheric pressure VPA, quantity of suction air QA, reference voltage VH and VL, and negative pressure VD in place of the quantity of suction air QA are respectively supplied to multiplexer 122 of the input/output circuit 120. On the basis of an instruction program stored in the ROM 118, the CPU 114 assigns the addresses of these inputs through the address bus, and the analog inputs of the assigned addresses are stored. The analog inputs are sent from the multiplexer 122 to the analog-to-digital converter 124. The digital values from the analog-to-digital converter 124 are stored in registers corresponding to the respective inputs, and they are loaded into the CPU 114 or RAM 116 on the basis of instuctions from the CPU 114 fed through the control bus 166, as may be needed.

The reference pulses PR and the angle signal PC are applied to the pulse input circuit 128 through a filter 168 from the angle sensor 98 in the form of pulse trains. Further, from a vehicular velocity sensor 170, pulses PS at a frequency corresponding to a vehicular velocity are applied to the pulse input circuit 128 through a filter 172 in the form of a pulse train.

Signals processed by the CPU 114 are held in the pulse output circuit 126. An output from the pulse circuit 126 is applied to a power amplifier circuit 186, and the fuel injectors are controlled on the basis of this output signal.

Shown at 188, 194, and 198 are power amplifier circuits, which respectively control the primary coil current of the ignition coil 40, the degree of opening of the exhaust gas recirculator 28, and the degree of opening of the air regulator 48 in response to the output pulses from the pulse output circuit 126. The discrete input/output circuit 130 receives and holds signals from a switch sensor 174 for detecting that the throttle valve 20 is in the fully closed state, a starter switch sensor 176 and a gear switch sensor 178 indicating that the transmission gear is a top gear, through filters 180, 182, and 184 respectively. Further, it stores the processed signals from the CPU 114. The signals with which the discrete input/output circuit 130 is concerned are signals each of which can have its content indicated by one bit. Subsequently, signals are sent from the discrete input/output circuit to power amplifier circuits 196, 200, 202, and 204 by the signals from the CPU 114. The amplified signals are used to close the exhaust gas recirculator 28 to stop the recirculation of the exhaust gas, to control the fuel pump through 206, to indicate an abnormal temperature of the catalyst through indicator 208, and to indicate the overheat of the engine through indicator 210, respectively.

PULSE OUTPUT CIRCUIT (126)

Figure 4:
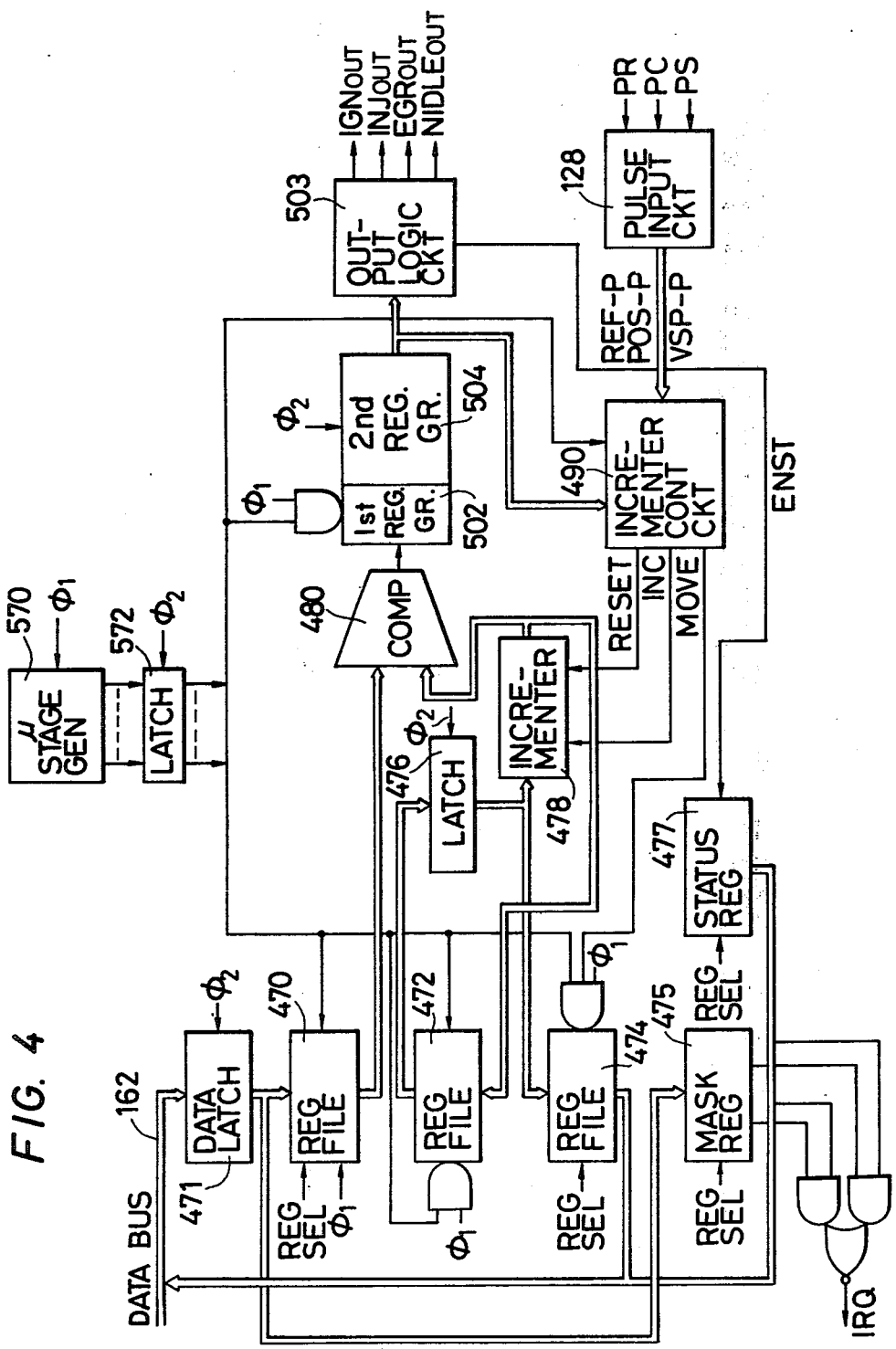
FIG. 4 is a block diagram showing a pulse output unit of the control unit shown in FIG. 3.

FIG. 4 shows a specific configuration of the pulse output circuit 126. A first register file 470 includes a group of reference registers which hold the data processed by the CPU 114 or hold data indicative of predetermined values. The data is transmitted through the data bus 162 from the CPU 114. The assignment of the registers to hold the data is effected through the address bus 164, and the data is applied to the assigned registers and held therein.

A second register file 472 includes a group of registers which hold the signals indicative of the engine condition at an instant in time. The combination of the second register file 472, a latch circuit 476, and an incrementer 478 effect a so-called counter function.

A third register file 474 includes, for example, a register for holding the rotational speed of the engine and a register for holding the vehicular speed. These values are obtained in such a way that when certain conditions are fulfilled, the values of the second register file 472 are loaded. A relevant register is selected by a signal sent through the address bus from the CPU 114 and the data held in the third register file 474 is sent to the CPU 114 through the data bus 162 from this register.

A comparator 480 receives reference data from a register selected from the first register file 470 and instantaneous data from a register selected from the second register file 472 and executes a comparative operation. The comparison result is delivered to and stored in a predetermined register selected from first register group 502 which function as comparison result holding circuits. Further, it is thereafter stored in a predetermined register selected from a second register group 504.

The read and write operations of the first, second, and third register files 470, 472, and 474, the operations of the incrementer 478 and the comparator 480, and the operations of setting outputs into the first and second register group 502, 504 are conducted during prescribed periods of time. Various processes are carried out in a time division manner in conformity with the stage sequence of a stage counter 570. At each stage, predetermined registers among the first and second register files and the first and second register groups and, if necessary, a predetermined register among the third register file 474 are selected. The incrementer 478 and the comparator 480 are used in common.

Description will be hereinafter given of each of the units making up pulse output unit 126.

STAGE PULSE GENERATOR (570)

Figure 7:
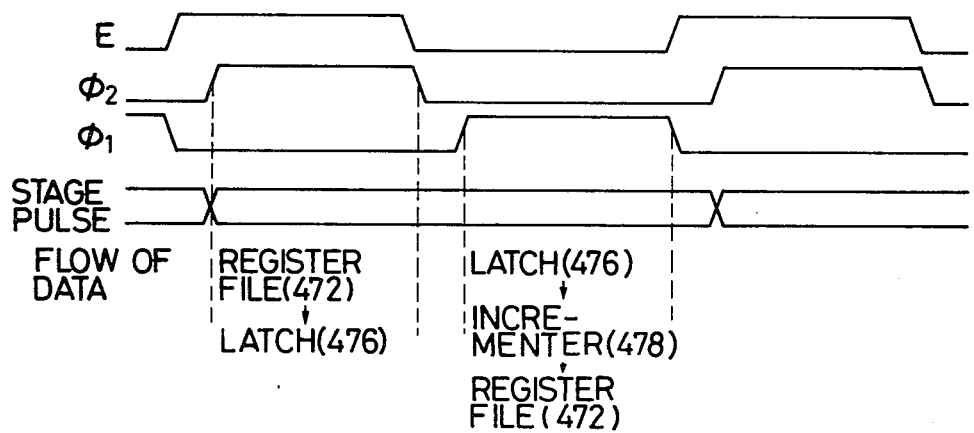
FIG. 7 shows waveforms of clock pulses and stage pulses.
Figure 9:
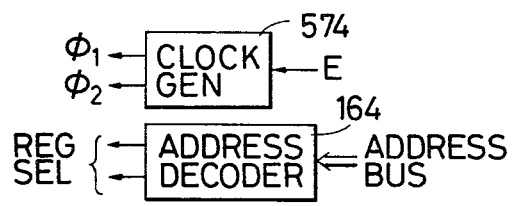
FIG. 9 is a block diagram showing a clock generator and an address decoder.
Figure 5:
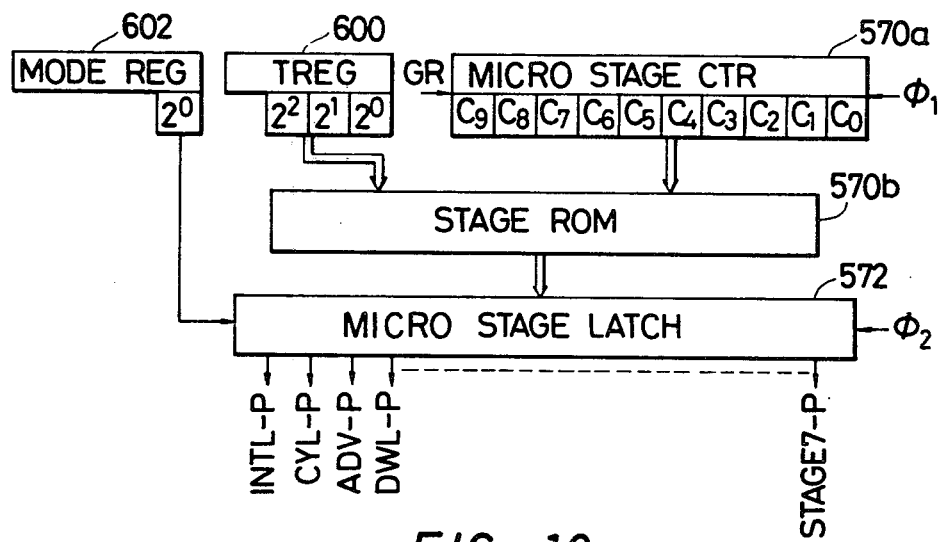
FIG. 5 shows a schematic diagram of a microstage pulse generaor of the input/output unit.

In FIG. 5, the stage pulse generator 570 includes a clock pulse generator 574 (FIG. 9) for generating clock pulses $\phi_1$ and $\phi_2$, a microstage counter 570a (FIG. 5), a stage ROM 570b (read only memory), and a microstage latch circuit 572. When an enabling signal E from the CPU 114 is applied to a clock generator 574 as shown in FIG. 9, clock generator 574 produces clock pulses $\phi_1$ and $\phi_2$ as shown in FIG. 7. The pulses $\phi_1$ and $\phi_2$ are different in phase and do not overlap. As can be seen in FIG. 5, the clock pulse $\phi_1$ is applied to the microstage counter 570a. The microstage counter 570a is a ten bit counter, for example, and operates to count the clock pulses $\phi_1$ applied thereto. The counted value of the microstage counter 570a is applied together with an output from a register 600 (hereinafter referred to as T register) to the stage ROM 570b. ROM 570b is designed to produce stage pulses INTL-P ~ STAGE 7-P through the microstage latch 572 in accordance with the contents of the microstage counter 570a and T register 600.

FIG. 6 shows the relationship between various kinds of stage pulses and the contents of the counter 570a and T register 600. In this table of FIG. 6, symbol X denotes that any one of "1" and "0" can be taken for the purpose of producing stage pulses as far as the bit X is concerned. By way of example, when the lowest three bits C2, C1, and C0 of the microstage counter 570a are "0", "0", and "1", respectively, a stage pulse INTL-P is delivered. The set value of the T register 600 functions to determine intervals between stage pulses INJ-P, as can be seen in the table. A thus produced stage pulse is shifted to the microstage latch circuit 572 in synchronism with the clock pulse $\phi_2$. The stage pulse is delivered from the latch circuit 572 when the lowest bit 2° of a mode register 602 is of the logical "1" when CPU 114 produces a GO signal and is set with the logical "0" when CPU 114 outputs a Non-GO signal. When the lowest bit 2° of the mode register 602 is of the logical "0", the stage latch circuit 572 delivers no stage pulses except for the predetermined stage pulses STAGE 0-P and STAGE 7-P. In other words, only the stage pulses STAGE 0-P and STAGE 7-P are permitted to appear without regard to the set value of the mode register 602. The stage pulse is preferably designed to have a pulse width of 1 μsec. All the elementary operations such as ignition control, fuel injection control, and detection of the engine stop are performed with the aid of the stage pulse.

REGISTER FILE (470, 472)

Figure 8A:
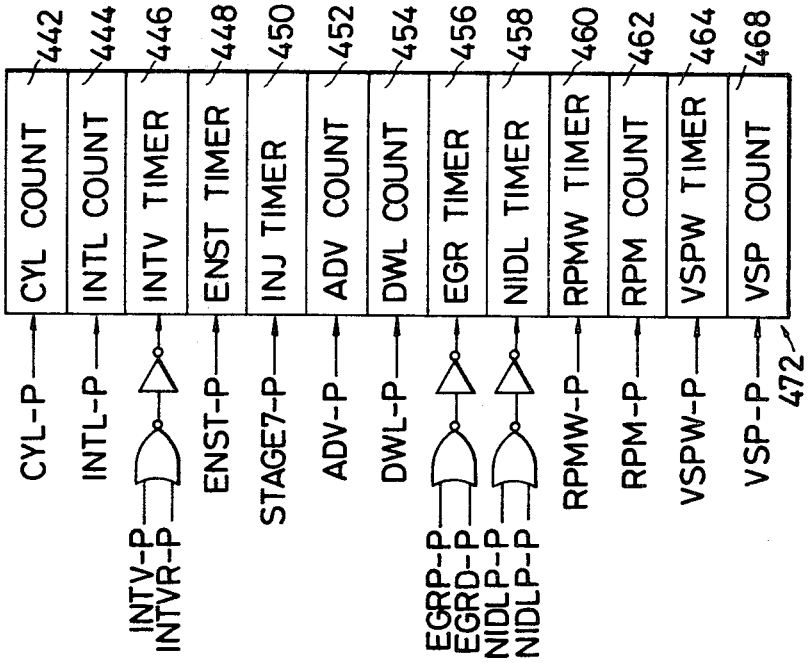
FIGS. 8A and 8B are schematic diagrams showing first and second register files of the input/output units.

In FIG. 4, data sent from the CPU 114 is applied through the data bus 162 to a latch circuit 471 and stored at the timing of the clock pulse $\phi_2$. Then the data is applied to a first register file 472 and is stored at the timing of the clock pulse $\phi_1$ in the register selected by the register select signal REG SEL supplied from the CPU 114. The register file 470 includes a plurality of registers 402, 404, . . . 428 as shown in FIG. 8A. These registers are designed to deliver the stored data by the application of the corresponding stage pulse thereto. By way of example, where the stage pulse CYL-P occurs at the output of the stage pulse latch circuit 572, the register 404 is selected to deliver its set data CYL REG as an output.

Figure 8B:
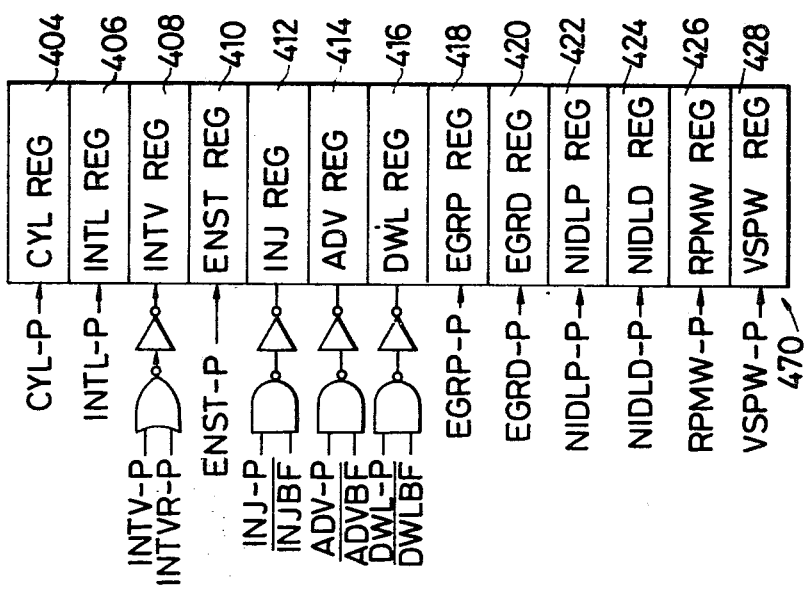

On the other hand, a second register file 472 includes a plurality of counters and timers 442, 444, . . . 468 as shown in FIG. 8B, each of which counts up pulses indicative of engine operating conditions as of the instant in time during engine operation. In the same manner as described in connection with the first register file 470, one of the counters (timers) is selected to deliver its count value when the corresponding stage pulse is applied thereto. Thus, the selected one of registers of the first register file 470 and the selected one of counters or timers of the second register file 472 deliver respective set data which is applied to a comparator 480 and are compared with each other. The comparator 480 produces an output when the count value of the counter or timer of the second register file 472 becomes equal to or greater than the set value of the register in the first register file 470. As will be appreciated from FIGS. 8A and 8B, when the stage pulse CYL-P appears, for example, the contents of the register 404 and the counter 442 are compared with each other. Respective registers, counters, and timers are designed to have functions as explained below.

A register 404 stores data CYL REG indicative of a constant value determined in terms of the number of cylinders. On the other hand, a counter 442 counts up the reference pulses INTLD, the determination of which will be discussed hereinafter. By the comparison of the set value of the register 404 with the count value of the counter 442, a pulse is obtained every one revolution of crank angle. Data INTL REG stored in a register 406 are used to shift the reference pulse PR in phase by the amount of a fixed angle. A counter 444 counts up the crank angle pulses PC produced after the reference pulse PR is detected by the angle sensor 98.

A register 408 holds data INTV REG representative of the period of time desired to be measured as a timer. On the other hand, a timer 446 counts up stage pulse INTV-P produced at intervals of a predetermined period of time, e.g. 1024 μsec. after the setting of data INTV REG into the register 408 has been completed. When the data INTV REG is set, there is established e.g. the stage in which an interrupt signal can be delivered after the lapse of the prescribed period of time. That is, the count value INTV TIMER of the timer 446 is compared with the set data INTV REG of the register 408, and when INTV TIMER becomes equal to or greater than INTV REG, the above-mentioned stage is established.

A register 410 holds the data ENST REG representative of a predetermined period of time to be used for detecting the state in which the engine has stopped unexpectedly. A timer 448 counts up stage pulses ENST-P which occur every certain time, e.g., 1024 μsec. after the reference pulse PR has been detected from the angle sensor 98. The count value ENST TIMER of this timer 448 is returned to zero when the next reference pulse PR is detected. When the count value ENST TIMER becomes equal to or greater than the set data ENST REG, it is seen that the reference pulse PR does not appear for more than the predetermined period of time after the occurrence of the previous reference pulse. In other words, this means the engine has possibly stopped.

A register 412 holds the data INJ REG representative of the valve opening time of the fuel injection valve 66 as shown in FIG. 3. A timer 450 counts up the stage pulse INJ-P which appears every predetermined period of time after a stage pulse CYL-P has been delivered from the microstage latch circuit 572 (FIG. 5). The period of time mentioned above is one selected from 8 μsec., 16 μsec., 32 μsec., 64 μsec., 128 μsec., and 256 μsec. This selection is performed by the data set into the T register 600 (FIG. 5). As is apparent from FIG. 6, when the three bits of the T register 600 are expressed as "0, 0, 0", the stage pulse INJ-P is delivered at intervals of 8 μsec. When the T register 600 stores three bits of "0, 0, 1", the microstage latch circuit 572 (FIG. 5) delivers the stage pulse INJ-P every 16 μsec. A register 414 is used to store the data ADV REG representative of the timing of ignition.

Figure 15:
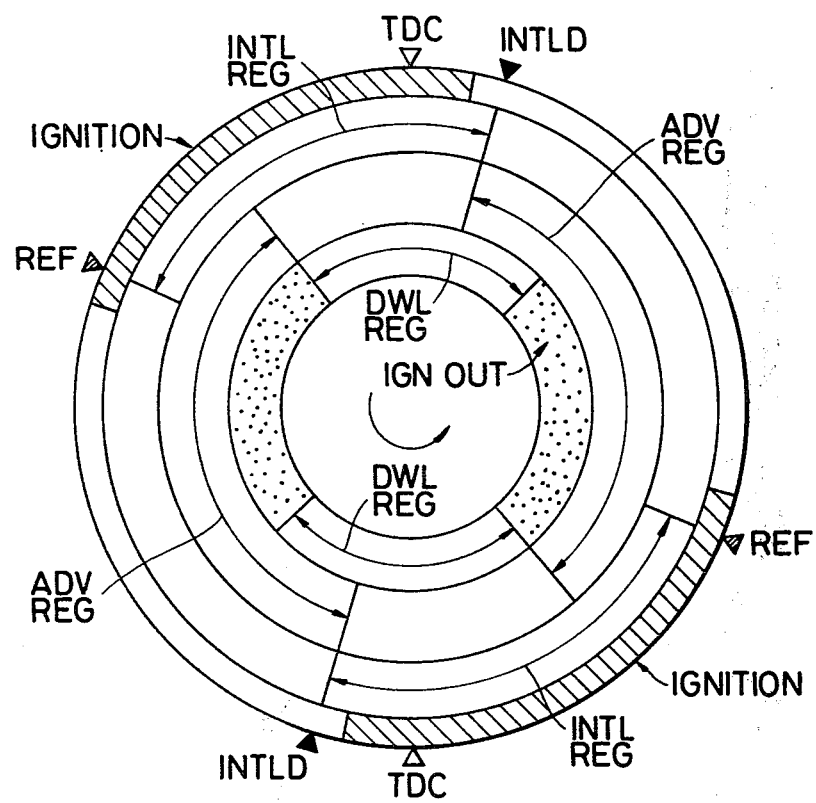
FIG. 15 is a schematic diagram for explaining operation of the engine control system.

The ignition may be performed at the predetermined crank angle indicated by the data ADV REG, after or before the occurrence of the reference pulse INTLD (FIG. 15). A counter 452 counts up the angle pulses PC after the stage pulse INTL-P has been delivered. The angle pulses PC are delivered from the angle sensor 98 each time the engine is rotated by a predetermined amount of crank angles e.g., 0.5°. A register 416 is provided to set the data DWL REG indicative of the angular period during which the primary coil current of the ignition coil is held in the cut-off state, as can be seen from FIG. 15. A counter 454 counts up pulses generated in synchronism with the crank angle pulses PC after the stage pulse INTL-P has been delivered.

A register 418 is provided to store the data EGRP REG representative of the period of the pulsating current signal supplied to the EGR valve 28 (FIG. 3). A register 420 holds the data representative of the pulse width of the pulsating current signal supplied to the EGR valve 28. On the other hand, a timer 456 counts up pulses produced every lapse of a fixed time. e.g. 256 μsec. after the stage pule EGRP-P has been delivered.

As mentioned heretobefore, the quantity of air passing through the bypass 46 of throttle chamber 18 can be adjusted by means of the air regulator 48. A register 422 holds the data NIDLP REG representative of the period of the pulse applied to the regulator 48 and a register 424 stores the data NIDLD REG indicative of the pulse width. A timer 458 counts up the pulses produced every lapse of a fixed time, e.g., 256 μsec. after the stage pulse NIDLP-P has been delivered. A rotational speed of the engine is detected by counting the output pulses of the crank angle sensor 98 for a predetermined period of time.

A register 426 is used to store the data RPMW REG representative of the period of time during which the crank angle pulses are counted. On the other hand, a register 428 is provided to hold the data VSPW REG representative of a fixed time to be used for detecting the vehicular speed. A timer 460 counts up the pulses generated every lapse of a fixed time after an output pulse has been delivered from the latch circuit 552. A counter 462 is used to count up the pulses produced in a predetermined relationship with the angle pulse PC, after the output pulse has been delivered from the latch circuit 552. Likewise after generation of an output from a latch circuit 556, a timer 464 counts up the pulses generated every lapse of a fixed time while a counter 468 counts up the pulses produced in response to the rotational speed of the wheels.

The data set into each of registers of the first register file 470 is supplied from the CPU 114. The pulses to be counted by means of respective timers and counters of the second register file 472 are supplied from an incrementer 478.

Of the data to be set into the first register file 470, those which are to be set into the registers 404, 406, 408, 410, 426 and 428 are constants. The other data which are to be set into the registers 412, 414, 416, 418, 420, 422 and 424 are experimentally obtained in known manners from sensed signals of various sensors.

INCREMENTER (478)

The incrementer 478 receives control signals INC and RESET from a controller 490 and is designed to produce an output being equal to the set value of the latch circuit 476 plus one when the control signal INC is applied thereto and to produce an output of zero when the control signal RESET is applied thereto. Since the output of the incrementer 478 is applied to the second register file 472, the register of the second register file 472 functions as a timer or counter which counts up one by one in response to the control signal INC.

The logic circuit of such an incrementer is well known to those skilled in this art and therefore the details thereof will not be described in this specification. The output of the incrementer 478 is applied to the comparator 480 together with the output of the first register file 470. As described previously, the comparator 480 produces an output of the logical "1" when the output of the incrementer 478 becomes equal to or greater than the output of the first register file 470. Otherwise it produces an output of the logical "0". The input to the incrementer 478 is set into a third register file 474 in synchronism with the clock pulse $\phi_1$ when a control signal MOVE is applied to the register file 474. The set data of the third register file 474 can be transferred through the data bus 162 to the CPU 114.

Precisely stated, the incrementer 478 has three functions as follows. The first is an incremented function be which the input data to the incrementer 478 is added by one. The second is a non-increment function by which the input data to the incrementer 478 is passed therethrough without any operation of the addition. The third is a reset function by which the input to the incrementer 478 is changed to zero so that the data indicative of zero is delivered therefrom at all times without regard to its input value.

As mentioned previously, when one of the registers is selected from the second register file 472, the data stored in the selected register is applied through the latch circuit 476 to the incrementer 478 whose output is fed back to the selected register so that the contents of the selected register are refreshed. As a result, where the incrementer 478 offers the increment function by which the input thereof is increased by one, the selected register of the second register file functions as a counter or timer.

In the closed loop including the register file 472, latch circuit 476 and incrementer 478, if such an operation condition occurs that the output of the incrementer 478 begins to be set into the second register file 472 while the contents of the register file 472 are being delivered, the error of the counting operation will be caused at the register file 472. To eliminate such an error, the latch circuit 476 is provided to separate the time between the data flow from the file register 472 to the incrementer 478 and the data flow from the incrementer 478 to the file register 472.

The latch circuit 476 is applied with the clock pulse $\phi_2$ and is permitted to receive data from the register file 472 during the period of time that the clock pulse $\phi_2$ appears, as shown in FIG. 7. On the other hand, the register file 472 is applied with the clock pulse $\phi_1$ and is permitted to receive data from the latch circuit 476 through the incrementer 478 during the period of time that the clock pulse $\phi_1$ appears. As a result, there will be no interference between data flows delivered from and applied to the second register file 472. COMPARATOR (480)

A GROUP OF REGISTERS (502. 504)
OUTPUT LOGIC CIRCUIT (503)

Like the incrementer 478, the comparator 480 does not operate in synchronism with the clock pulses $\phi_1$ and $\phi_2$. Inputs of the comparator 480 are the data delivered from the selected register of the register file 470 and the data delivered from the selected counter or timer through the latch circuit 476 and the incrementer 478. The output signal of the comparator 480 is applied to a first register group including a plurality of latch circuits, and is set to the selected latch circuit in synchronism with the clock pulse $\phi_1$. The data thus written into the first register group is then shifted to a second register group in synchronism with the clock pulse $\phi_2$. An output logic circuit 503 receives the data set in the second register group to produce output signals for driving the fuel injector, ignition coil, exhaust gas recirculating device and the others. This output circuit 503 includes a logic circuit shown at the reference numeral 710 in FIG. 18, the operation of which will be described later. The first and second register groups include a plurality of latch circuits 506, 510, ... 554 and 508, 512, ... 556, respectively, as shown in FIG. 10.

The data CYL REG of the register 404 (FIG. 8A) are compared with the count value CYL COUNT of the counter 442 by means of the comparator 480. The comparator 480 delivers an output of logical "1" when CYL COUNT becomes equal to or greater than CYL REG and the resulting output is then set into a latch circuit 506 of the output register group 502. The selection of this latch circuit 506 is performed by way of the stage pulse CYL-P. The set data into the latch circuit 506 is applied to the latch circuit 508 at the timing of the clock pulse $\phi_2$. The latch circuits of the first output register group 502 are respectively connected to the corresponding latch circuits of the output register group 504. In a similar way, a signal logical "1" is set into the latch circuit 510 when the condition INTL REG≦INTL COUNT is detected. The content of the latch circuit 510 is shifted into the latch circuit 512 at the timing of clock $\phi_2$.

Likewise, upon the conditions that
INTV REG≦INTV TIMER,
ENST≦ENST TIMER,
INJ REG≦INJ TIMER,
ADV REG≦ADV COUNTER,
DWL REG≦DWL COUNTER,
EGRP REG≦EGR TIMER,
EGRD REG≦EGR TIMER,
NIDLP REG≦NIDL TIMER,
NIDLD REG≦NIDL TIMER,
RPMW REG≦RPMW TIMER, and
VSPW REG≦VSPW TIMER
a signal of logical "1" is respectively set in the latch circuits 514, 518, 522, 526, 530, 534, 538, 542, 546, 550 and 554. Since each of latch circuits of the ouput register groups 502 and 504 stores information of either "1" or "0", they may be 1 bit registers.

INCREMENTER CONTROL CIRCUIT (490)

Figure 17:
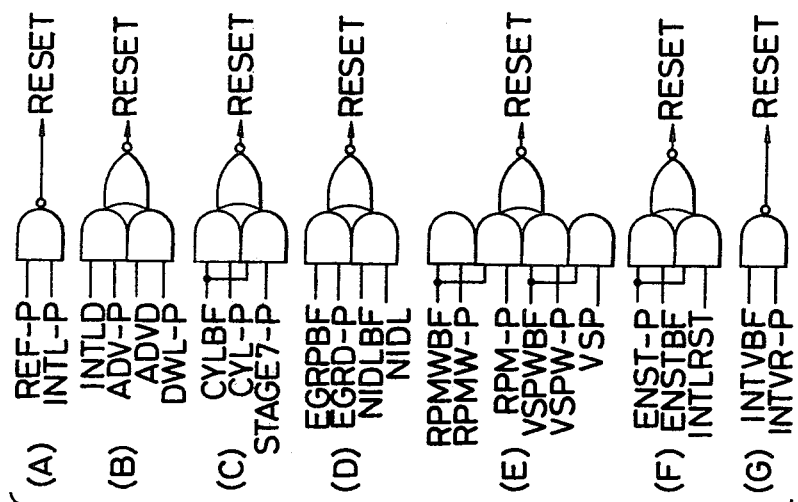
FIG. 17 is a schematic diagram showing a logic circuit for producing a reset signal.
Figure 16:
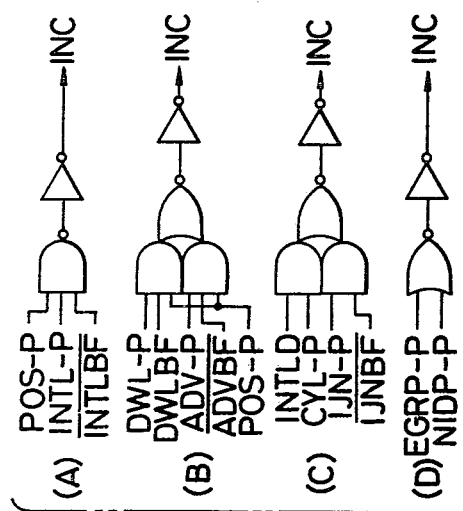
FIG. 16 is a schematic diagram showing a logic circuit for producing an increment control signal.

The incrementer control circuit 490 includes logic circuits shown in FIGS. 16 and 17 and produces control signals INC, RESET, and MOVE for the control of the incrementer 478. The operation and details of the incrementer control circuit 490 will be described later.

STATUS REGISTER (477)
MASK REGISTER (475)

The status register 477 is provided to indicate whether or not there are interrupt requests due to the engine stop ENST, the termination of the A-D converter operation, and other teminations. The mask register 475 is adapted to receive data sent through the data bus from the CPU 114. Depending upon the data received, the mask register 475 functions to control the inhibition or admission of sending interrupt request signal IRQ to the CPU 114 when such interrupt request has occurred.

INPUT SIGNAL SYNCHRONIZER CIRCUIT (128)

This circuit 128 receives sensed pulses indicative of, for example, the rotational speed of the engine and a vehicular speed, and produces an output pulse synchronized with the clock pulse $\phi_1$ or $\phi_2$. The pulses sensed and applied to the synchronizer circuit 128 are a reference signal PR which is generated every revolution of the engine, an angle signal PC produced each time the engine rotates a predetermined angle, and a pulse PS indicative of the vehicle running speed. The intervals of these pulses change greatly depending on, for example, the vehicular speed, and are not synchronized with the clock pulses $\phi_1$ and $\phi_2$. In order to use these pulses PR, PC, and PS for the control of the incrementer 478, the sensed pulses must be synchronized with the stage pulse. Further, the angle signal PC and the vehicular speed signal PS are to be synchronized at both the rising portions and falling portions with the stage pulse for the improvement of detection accuracy while the reference signal PR may be synchronized at its rising with the stage pulse.

Figure 11:
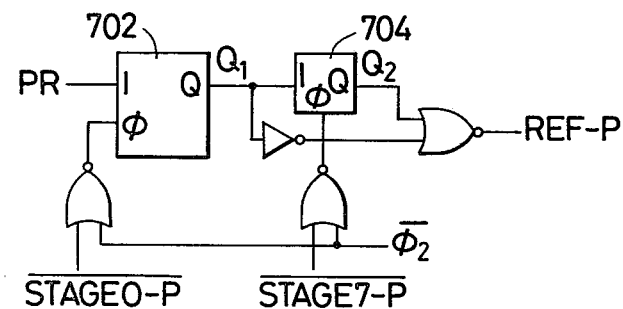
FIG. 11 is a schematic diagram of a logic circuit for producing a reference signal.
Figure 12:
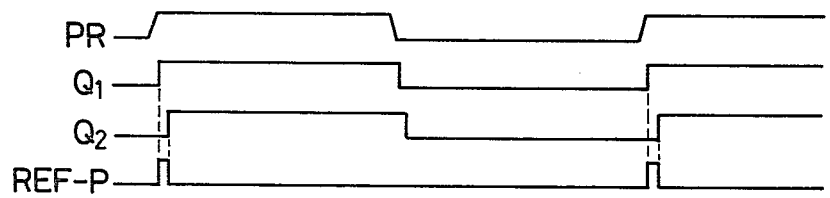
FIG. 12 shows waveforms of signals appearing at respective points of the logic circuit shown in FIG. 11.

In FIG. 11, showing a logic diagram of a synchronizer circuit for the reference signal PR, the sensed signal PR is applied to a terminal I, and the inverted clock pulse $\phi_2$ as well as the inverted stage pulse STAGE 0-P are applied through a NOR logic circuit to a terminal $\phi$ of a latch circuit 702. The latch circuit 702 produces, at a terminal Q, an output pulse shown at $Q_1$ in FIG. 12. Another latch circuit 704 receives at its terminal I the pulse $Q_1$, and at its terminal $\phi$ the inverted clock pulse $\phi_2$ together with the inverted stage pulse STAGE 7-P through the NOR logic circuit. As a result, the latch circuit 704 produces an output shown at $Q_2$ in FIG. 12. A synchronized reference pulse REF-P is produced the output $Q_2$ and the inverted output $Q_1$ as shown at REF-P in FIG. 12.

Figure 13:
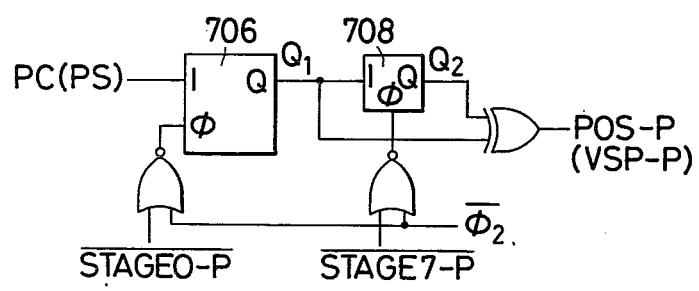
FIG. 13 is a schematic diagram of a logic circuit for producing an angle signal.
Figure 14:
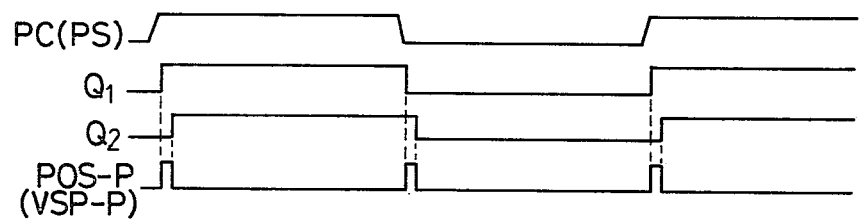
FIG. 14 shows waveforms of signals appearing at respective points of the logic circuit shown in FIG. 13.

In FIG. 13, showing a synchronizer circuit for the angle signal PC and the vehicular speed signal PS, the sensed signal PC (or PS) shown in FIG. 14 is applied to a terminal I while the inverted clock pulse $\phi_2$ and the inverted stage pulse STAGE 0-P are applied through a NOR logic circuit to a terminal $\phi$ of a latch circuit 706. Obtained from a terminal Q of the latch circuit 706 is signal $Q_1$ shown in FIG. 14, which is applied to a terminal I of a latch circuit 708. The output $Q_1$ and $Q_2$ of the latch circuits 706 and 708 are applied to an exclusive OR logic circuit to generate a synchronized signal POS-P (or VSP-P).

OPERATION (1) Producing a Reference Pulse INTLD

For the control of ignition timing, fuel injection and the detection of the engine stop, it is necessary to produce the reference pulse INTLD which is delayed by the angle corresponding to the value INTL set in the register 406 from the pulse PR obtained by means of a crank angle sensor, as shown in FIG. 15. This pulse INTLD serves to set the reference point for the controls such as the ignition timing. The reference point is set at the position spaced by a predetermined angle from the top dead center of the engine, so that the ignition can take place at the predetermined timing irrespective of the mounting position of the crank angle sensor. When the stage pulse generator 570 produces the stage pulse INTL-P, the register 406 of the first register file 470 and the counter 444 of the second register file 472 are selected for the operation of comparison, as seen from FIGS. 8A and 8B. At the same time, the incrementer controller 490 produces the increment control signal INC by means of the logic circuit shown in FIG. 16(A) and the reset signal RESET by means of the logic circuit shown in FIG. 17(A). Both the increment control signal INC and the reset signal RESET are applied to the incrementer 478. The counter 444 counts up the stage pulse POS-P so that the resulting count value increases gradually as shown at INTL COUNT in FIG. 19. When the count value INTL COUNT of the counter 444 becomes equal to or greater than the set value INTL REG of the register 406, that is, INTL REG≦INTL COUNT, the comparator 480 produces an output which is applied to the latch circuit 510 of the first register group 502, and then to the latch circuit 512 of the second register 504 as shown in FIG. 10. The logic circuit shown at a reference number 710 in FIG. 18 is connected to the output of the latch circuit 512 so that the reference pulse INTLD shown in FIG. 19 can be obtained at an output terminal 712 of the logic circuit 710. It is noted in FIG. 19 that the pulse INTLBF used for producing INTLD pulse is an output from the latch circuit 512 of FIG. 10.

As can be seen from FIG. 16(A), not only the stage pulses POS-P, INTL-P, but also the inverted output INTLBF of the latch circuit 512 are utilized for producing the increment control signal INC so that the counter 444 will terminate its counting operation when the condition of (INTL COUNT)≧(INTL REG) is detected by the comparator 480. Reasons for the necessity for the termination of the counting operation are as follows. In the case of a four cylinder engine, the reference pulse REF-P is produced once every 180° of the crank shaft movement. If the crank angle sensor is designed to generate pulses POS-P every 0.5° of angular movement of the crank shaft, the number of pulses POS-P becomes more than 360 between two adjacent reference pulses REF-P. Since the counter 444 is usually designed to have eight bits, the above-mentioned number of reference pulse REF-P is great enough to cause overflow in the counter 444, thereby producing another pulse INTLD at the undesired timing. The use of the output pulse INTLBF for producing the increment control signal serves to prevent the producing of such an undersired reference pulse.

(2) Ignition Control

In the operation of the ignition control, a control signal IGN out is produced which flows through the ignition coil. For this control, data ADV indicative of the ignition timing and data DWL indicative of the nonconductive period of time of the ignition coil are supplied from the CPU 114 and set into the registers 414 and 416, respectively. FIG. 15 shows the relationship between the set value ADV REG of the register 414 and the set value DWL REG of the register 416. The set value ADV REG serves to define a spark advance indicating the position of the crank shaft at which an ignition spark is to occur after (or before) the piston reaches its top dead center position, while the set value DWL REG indicates the number of crank angles during which the ignition coil is rendered nonconductive.

When the stage pulse ADV-P is delivered from the stage pulse generator 570, and applied to the first and second register files 470, 472, the register 414 and the counter 452 are selected for operation, as shown in FIGS. 8A and 8B. At the same time, the stage pulse ADV-P is applied to the incrementer controller 490 in which an increment control signal INC is produced by a logic circuit shown in FIG. 16(B) and a reset signal RESET is produced by a logic circuit shown in FIG. 17(B). By the application of the increment signal INC to the incrementer 478, the incrementer 478 functions to add "1" with the value set in the latch circuit 476 and delivers the resultant value to the second register file 472, so that the counter 452 of the second register file 472 counts up the synchronized angle pulses POS-P. When the count value ADV COUNT of the counter 452 is equal to or greater than the value of ADV REG in the register 414, the comparator 480 produces an output which is applied to a latch circuit 526 of the first register group 502 shown in FIG. 10. An output of the latch circuit 526 is applied to another latch circuit 528 and then to an output logic circuit 710 shown in FIG. 18. The logic circuit 710 functions to produce an output pulse ADVD shown in FIG. 20 from the output ADVBF of the latch circuit 528. This output pulse ADVD is used for producing a reset signal in the DWL-P stage (FIG. 17(B)). When the stage pulse DWL-P is delivered from the stage pulse generator 570, the register 416 of the first register file 470 and the counter 454 are selected for operation as can be seen from FIGS. 8A and 8B. In the incrementer controller 490, the increment control signal INC and the reset signal RESET are produced by logic circuits shown in FIGS. 16(B) and 17(B), respectively. As a result, the counter 454 increases its count value in accordance with the pulse POS-P and remains at constant value upon reaching the set value DWL REG of the register 416 and is then reset by the aforementioned pulse ADVD as shown in FIG. 20. The comparator produces an output signal which is rendered into its on-state when the count value DWL COUNT is equal to the set value DWL REG. As a result, the latch circuit 532 delivers an output pulse shown at IGN out in FIG. 20, which is supplied to the ignition coil.

(3) Fuel Injection Control

In operation of the fuel injection control, the timing of the fuel injection relative to the ignition timing and the others is shown in FIG. 2. As will be appreciated from FIG. 2, the fuel injection takes place once every revolution of the engine at the same time for all the cylinders.

Figure 21:
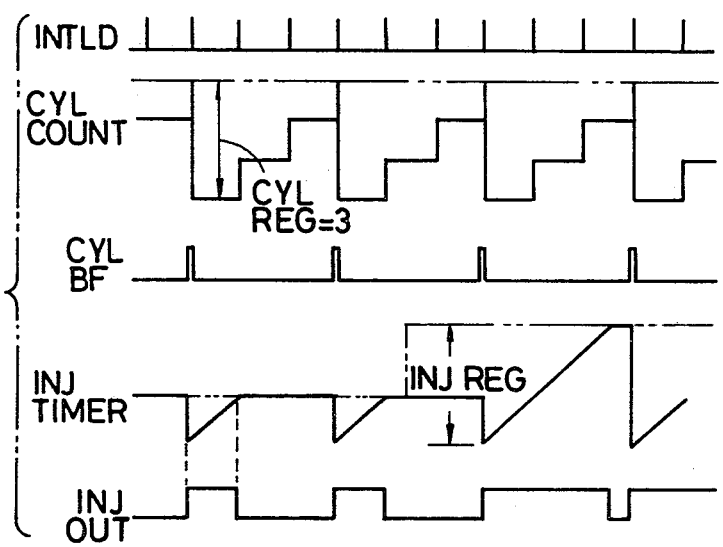

When the stage pulse CYL-P is delivered from the stage pulse generator 570, such pulse serves to select the register 404 of the first register file 470 and the counter 442 of the second register file 472 as shown in FIGS. 8A and 8B. The register 404 is preliminarily set with a constant value CYL REG which is, for example, equal to 2 in the case of a four cylinder engine, and 4 in the case of a six cylinder engine. By the application of the stage pulse CYL-P to the increment control circuit 490, the control circuit 490 produces an increment control signal INC and a reset signal RESET by means of logic circuits shown in FIGS. 16(C) and 17(C), respectively. As a result, the count value CYL COUNT of the counter 444 varies in accordance with the pulse INTLD as shown in FIG. 21, and when the count value CYL COUNT of the counter 444 reaches a value equal to the set constant number CYL REG, the latch circuit 508 produces an output shown at CYLBF in FIG. 23.

Following the above-mentioned stage, when the next stage pulse INJ-P is produced, the register 412 of the first register file 470 and the timer 450 of the second register file 472 are selected for operation of the comparison. At the same time, the incrementer 490 is given an increment control signal INC and a reset signal RESET produced by logic circuits shown in FIGS. 16(C) and 17(C), respectively. With the aid of the incrementer 478, the timer 450 increases its value until the value becomes equal to the set data INJ REG of the register 412 and is reset by the aforementioned pulse CYLBF. The comparator 480 delivers an output signal during the condition of INJ TIMER≧INJ REG being met. Since the output logic circuit 710 shown in FIG. 18 is connected with the latch circuit 524 to which the comparator output is applied through the latch circuit 522, an injection control signal shown at INJ out can be obtained at the output terminal 712 of the output logic circuit 710. The reason why the timer 450 is designed to terminate its counting operation when the count value INJ COUNT becomes equal to the set value INJ REG of the register 412 is to prevent the timer 450 from overflowing in its count value just like the case of the ignition control. The presence of the injection control signal INJ out is set at the bit of 2° in the status register 477 in synchronism with the clock pulse $\phi_1$ so that the CPU 114 may be informed of the condition of the injection control signal INJ out, if necessary.

(4) EGR and NIDL Controls

EGR control is defined as adjusting the valve 28 to enable a suitable amount of exhaust recirculating gas to be entered into the intake manifold 26. NIDL control is defined as adjusting the screw 44 or a valve at the idling operation to permit a suitable amount of air to be entered into the intake manifold 26. Both controls are so-called duty controls by which the pulse width of an output is changed while the interval of the output pulses remains unchanged.

In order to set the width of the valve control pulse, registers 420 and 424 are provided as shown in FIG. 8A. The registers 418 and 422 are provided to set the interval of the output pulses. Since the basic operation of the EGR control is substantially the same as that of the NIDL control, only the EGR control will be discussed.

Figure 22:
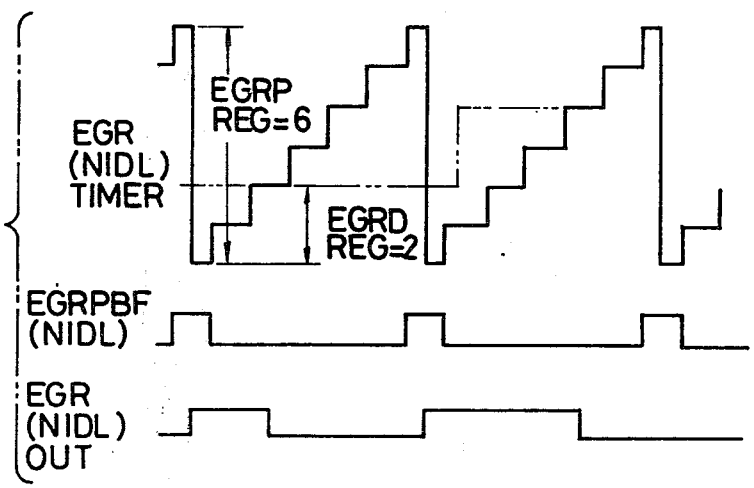

By the stage EGRP-P, the register 418 of the first register file 470 and timer 456 of the second register file 456 are selected for operation of the comparison, and the incrementer 478 is applied with an increment control signal INC which is produced by means of a logic circuit shown in FIG. 16(D). As a result, the timer 456 counts up the stage pulse EGRP-P and produces an output signal shown at EGR TIMER in FIG. 22. When the count value EGR TIMER becomes equal to or greater than the set value EGRP REG, the latch circuit 536, applied with an output from the comparator 480 through the latch circuit 534, produces a signal shown at EGRPBF in FIG. 22. This signal, EGRPBF, serves together with the pulse EGRD to produce a reset signal at a control stage EGR-P. The timer 456 is commonly used at both the control stages EGR-D and EGR-P. When the count value EGR TIMER of the timer 456 becomes equal to or greater than the set value EGRD REG of the register 420, the comparator 480 produces an output which is applied to a latch circuit 538 and then to a latch circuit 540. The latch circuit 540 delivers an output signal shown at EGR out in FIG. 22. The opening and closing of the EGR valve is controlled in response to the output signal EGR out thus obtained.

(5) Measurements of the Revolutions of the Engine and the Vehicular Speed

The revolutions per unit time of the engine are measured by counting, for the predetermined period of time, the number of pulses POS-P detected by means of the crank angle sensor mounted on the crank shaft. The measurement of the vehicular speed is performed by counting for the predetermined period of time the output pulses sensed by the vehicular speed sensor. Both of the measurements are substantially the same in principle, therefore the description will be made of the measurement of the revolutions per minute of the engine.

As mentioned before, a register 426 is set with data RPMW REG representative of the time width $TW_o$ over which the number of revolutions of the engine is measured. Of course, the data RPMW REG 426 can be freely changed by the CPU 114. The timer 460 counts up clock pulses generated at fixed periods of time. The pulses are actually produced in synchronized relationship with the stage pulse RPMW-P.

Figure 28:
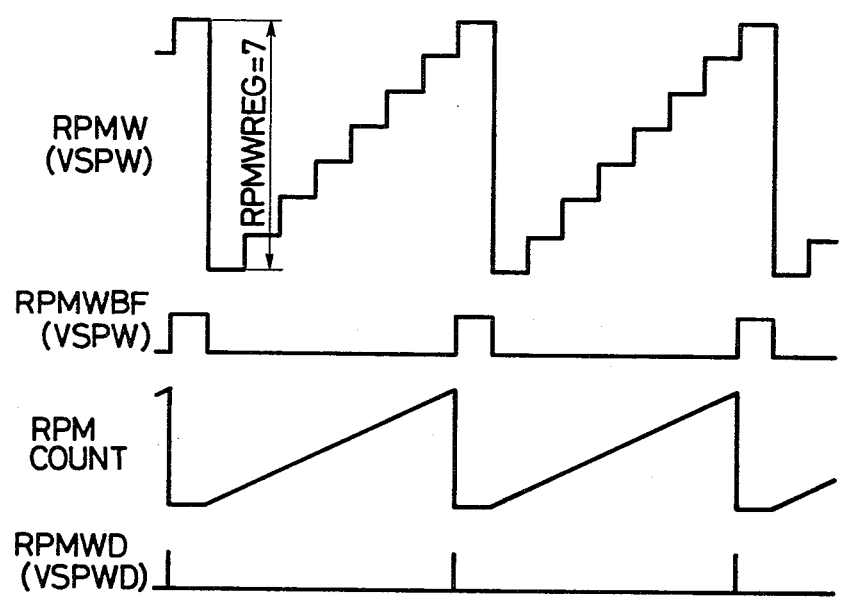

When the stage pulse RPMW-P is delivered from the microstage generator 570, the register 426 of the first register file 470 and the timer 460 of the second register file 472 are selected for operation. Upon the application of the stage pulse RPMW-P to the incrementer control circuit 490, it produces an increment control signal INC by means of a logic circuit shown in FIG. 16(E), and a reset signal RESET by means of a logic circuit shown in FIG. 17(E), both of which are applied to the incrementer 478. As a result, the timer 460 increases its count value RPMW TIMER as shown in FIG. 28. When the count value RPMW TIMER of the timer 460 becomes equal to or greater than the set value RPMW of the register 426, the comparator 480 delivers an output applied to the latch circuit 550 and then shifted to the latch circuit 552. Shown at RPMWBF in FIG. 28 is one output of the latch circuit 552 which is applied to the logic circuit shown in FIG. 17(E) for producing the reset signal. Since the output logic circuit 710 shown in FIG. 18 is connected to the output stage of the latch circuit 552, an output pulse RPMWD appears at the terminal 712 of the output logic circuit 710.

When the stage pulse RPM-P is delivered, the counter 462 of the second register file 472 is selected. This counter 462 counts the pulses POS-P between two adjacent pulses RPMW-P so that the count value RPM COUNT of the counter 462 increases as shown in FIG. 28. The count value RPM COUNT will be transferred to the third register file 474 in synchronism with a control signal MOVE produced by the incrementer control circuit 490. The set data in the third register file 474 will be transferred by way of the data bus 162 to the CPU 114.

According to the present invention, the measurement time width is made small at high speed revolutions of the engine, while it is made large at low speed revolutions, thereby intending to enhance the precision of the measurement of the revolutions. Namely according to one embodiment of the present invention, the following three modes are provided for the measurement of the number of revolution of the engine. For the simplicity of explanation, these three modes are hereinafter referred to as mode 1, mode 2 and mode 3, respectively. In modes 1, 2 and 3, different time widths $TW_1$, $TW_2$ and $TW_3$ are respectively used for measuring the revolutions, where $TW_1 > TW_2 > TW_3$.

Time width $TW_1$ is used for the measurement of engine revolutions ranging from 0 to 1600 r.p.m., while time width $TW_2$ is used for the revolutions ranging from 1600 to 3200 r.p.m., and further, time width $TW_3$ is used for the revolutions in the range from 3200 to 6400 r.p.m. Each of time widths for the modes 1, 2 and 3 is determined as follows.

(a) Mode 1

For the operation of mode 1, time width $TW_1$ is selected to be a value with which the content RPM COUNT of the counter 462 becomes $2^{10}$ at N=1600 r.p.m.

Namely, the time width $TW_1$ is obtained from the following equation:

$$1600 = \frac{2^{10} \times 0.5°}{360°} \times \frac{1000}{TW_1} \times 60$$

$$\therefore TW_1 = \frac{160}{3} \approx 53.333 \text{ (ms)}$$

The resolution per digit at this time is 25/16 r.p.m. and the relative error $\epsilon_1$ is:

$\epsilon_1 = (25/16)/N \times 100$ (%)

(b) Mode 2

For the operation of mode 2, time width $TW_2$ is selected to be a value with which the content RPM COUNT of the counter 462 becomes $2^{10}$ at N=3200 r.p.m.

Namely, the time width $TW_2$ is expressed as follows $TW_2 = 80/3 = TW_1/2 = 26.666$ (ms)

The resolution per digit at this time is 25/8 r.p.m., and the relative error $\epsilon_2$ is $\epsilon_2 = (25/8)/N \times 100$ (%)

(c) Mode 3

A measurement time width $TW_3$ with which the count value RPM COUNT of the counter 462 becomes $2^{10}$ at N=6400 r.p.m. is employed for the operation of mode 3.

$TW_3$ and $\epsilon_3$ at this time are given as follows.

$TW_3 = 40/3 = TW_1/4 = 13.333$ (ms)

$\epsilon_3 = (25/4)/N \times 100$ (%)

Figure 24:
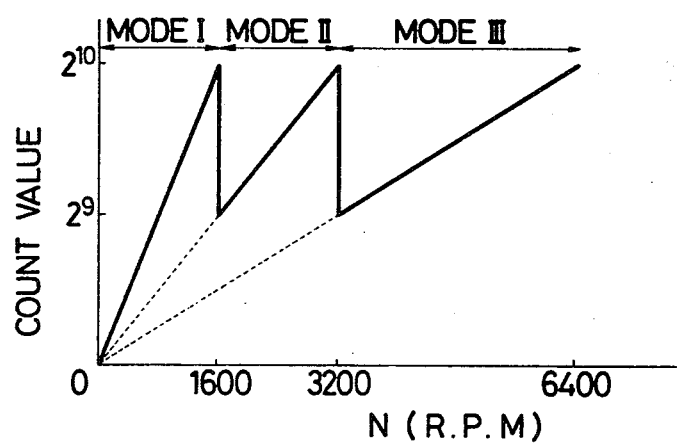
FIG. 24 shows the relationship between the number of revolutions of the engine and the count value of the counter.

As a result, the count value RPM COUNT of the conuter 462 changes in accordance with the number of revolutions of the engine, as shown in FIG. 24.

Figure 25:
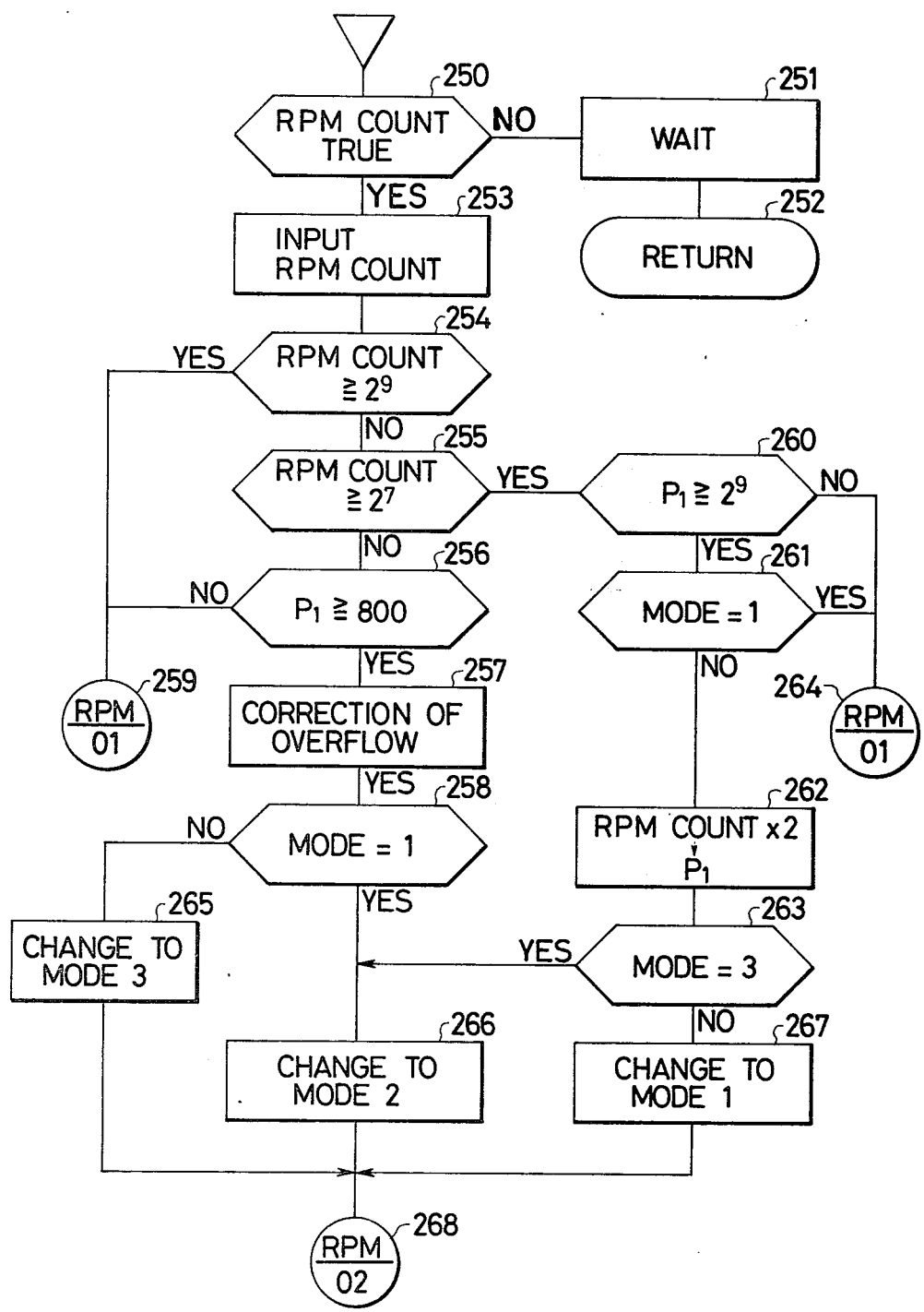
FIGS. 25 and 26 show flow charts for explanation of the operation of detecting engine revolutions.

FIG. 25 shows a program for the measurement of the number of engine revolutions which is stored in ROM 118 and executed in CPU 114. At a step 250 of the program, it is determined if the output of the counter 462 is a true value. This determination is performed as follows. According to the embodiment of the present invention, pulses produced over every fixed time are counted up by means of software (which is hereinafter referred to as a softtimer). The softtimer is set at the time the mode for operation has been changed. When the resultant value of the softtimer exceeds a predetermined value, a signal of logical "1" is set into a flag bit provided in a predetermined area of RAM 116. Namely, the flag bit is provided to indicate whether or not a fixed period of time has elapsed after the mode change was performed. At the step 250, information of the flag bit is read out from RAM 116, and if the flag bit is of logical "0", it is decided that the fixed time has not elpased from the mode change, and, therefore, the counter 462 has not completed the counting operation. In this case, the output RPM COUNT of the counter 462 is not regarded as a true value, therefore the operation proceeds to a step 251, at which a fixed time is allowed to elapse. At a step 252, the operation returns to the start of the flow again.

If the information of the flag bit is of logical "1", it is decided that the count value RPM COUNT of the counter 462 is a true value. At a step 253, the count value RPM COUNT of the counter 462 is applied to CPU 114 by way of the register file 474. At a step 254, it is determined whether the count value RPM COUNT is equal to or greater than $2^9$. If it is at least $2^9$, the mode change is unnecessary, and hence, the control proceeds to a step indicated at RPM/01 in FIG. 26.

At steps 255 and 256, it is checked if the counter 462 has overflowed, that is, if the count value has exceeded $2^{10}$. A method therefor is for example, to check an increment which is compared to the previous count value $P_1$ of the counter 462. In a case where the count value RPM COUNT at present is at least $2^7$, the counter 462 is not regarded as being in the overflow condition, and hence, the operation proceeds to the step 260. In a case where the count value RPM COUNT is less than $2^7$, there is the possibility of an overflow, and the operation proceeds to the step 256. At the step 256, the count value $P_1$ at the preceding time is read out from the RAM 116, and it is determined if this value is equal to or greater than a fixed value, for example, 800. Here, in a case where the value $P_1$ is less than 800, the overflow is not relevant, but the number of engine revolutions is originally a small value. Then, the control proceeds to a step indicated at RPM/01 in FIG. 26. However, in a case where the preceding value is at least 800 and where the present measurement value RPM COUNT is less than $2^7$, it is considered that the counter 462 has overflowed, and an overflow correction is necessary. The overflow correction is executed with the following equation.

$$\tfrac{1}{2} \times (\text{RPM COUNT} + 2^{10}) \rightarrow \text{RPM COUNT}$$

Here, the computation corresponding to the correction of overflow is the computation of (RPM COUNT+$2^{10}$). The multiplication of (RPM COUNT+$2^{10}$) by $\tfrac{1}{2}$ is made because the mode is corrected by changing the upper mode.

At a step 258, it is judged whether the mode at present is 1 or not. Because of the fact that the counter 462 has overflowed, the mode at present is presumed to be either 1 or 2. Accordingly, at the step 258, if the answer is no, the operation is regarded as being mode 2. In this case, the control proceeds to a step 265 at which the operation mode is changed to 3. For the change of operation from mode 2 into the mode 3, the softcounter is set with data indicative of a wait time of 20 msec. which is used at the step 250. Further, the register 426 is set with data RPMW REG representative of 13.3 msec. On the other hand, in a case where the mode has been determined to be 1 at the step 258, the control proceeds to a step 266 at which the operation mode is changed into 2. For the change in the operation mode from 1 to 2, the softcounter is set with data indicative of the wait time of 60 msec., and further the register 426 is set with data RPMW REG representative of 26.7 msec.

In a case where the count value RPM COUNT 462 is equal to or greater than $2^7$ at the step 255, the control proceeds to a step 260 at which it is determined if the preceding count value $P_1$ is at least $2^9$.

This determination 260 is effected to check if the engine speed is decreasing or not. If the preceding count value $P_1$ is less than $2^9$, it is determined that the engine speed is not decreasing. As a result, the mode change is not effected and, the operation proceeds to a step indicated at RPM/01 in FIG. 26. On the other hand, if the preceding count value $P_1$ is determined to be equal to or greater than $2^9$ at the step 260, it is considered that the engine speed is decreasing and the control proceeds to a step 261 at which it is decided if the present mode is 1.

If the present mode is determined to be 1, no mode change is carried out because the time width for measuring the number of revolutions cannot be further enlarged. As a result, the control proceeds to a step indicated at RPM/01 in FIG. 26.

In a case where the mode is determined not to be 1 at the step 261, it is desirable to enlarge the time width for measurement of engine revolutions since the engine speed is decreasing. In order to realize a count value RPM COUNT conforming with the new mode, at step 262 the count value RPM COUNT multiplied by 2 is set as $P_1$. By this correction for the count value, the comparisons of the steps 260 and 256 at the succeeding measurement can be made correctly.

At a step 263, it is determined if the present operation mode is 3. If the determination at the step 263 is no, then the present mode is determined to be 2, and the control proceeds to a step 267 at which the mode is changed to 1. For this change in mode from 2 to 1, the softtimer is set with data indicative of the wait time of 100 msec., and the register 426 is set with data representative of 53.3 msec.

On the other hand, if the operation mode at present is determined as mode 3 at the step 263, then the mode is changed to 2 at a step 266. From the steps 265, 266 and 267, the control proceeds to the next step indicated at RPM/02 in FIG. 26.

Figure 26:
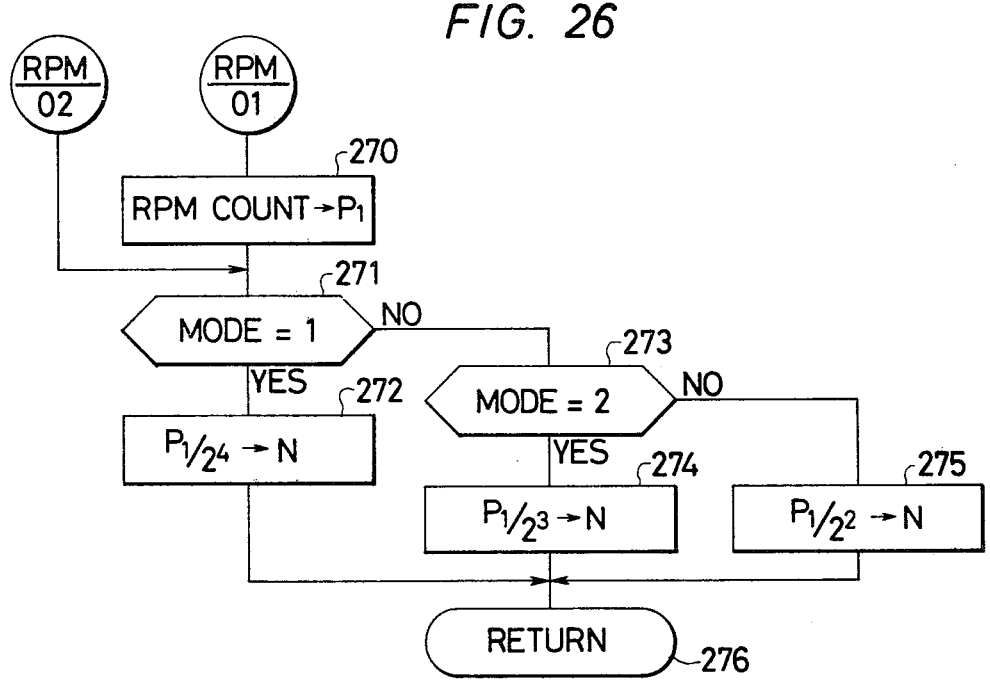

FIG. 26 shows a flow chart for calculating the number of revolutions from the count values which may be measured with different time widths.

As can be seen from the flow chart of FIG. 25, the count value $P_1$ has already been obtained before the step indicated at RPM/02. However, at the step indicated at RPM/01, $P_1$ is not yet set. At a step 270, therefore, the count value RPM COUNT is set for $P_1$.

At a step 271, whether the mode is 1 or not is determined. Here, if the mode is 1, the value of $P_1$ is divided by $2^4$ at a step 272. That is, the value of $P_1$ is shifted down by four digits. In a case where the mode is not 1, it is, of course, 2 or 3. The determination as to whether the mode is 2 or 3 is made at a step 273. If the mode is 2, the control proceeds to a step 274 at which the value of $P_1$ is divided by $2^3$. In other words, the value of $P_1$ is shifted down by three digits. On the other hand, in a case where it is decided at the step 273 that the mode is not 2, the control proceeds to a step 275, and the value of $P_1$ is divided by $2^2$. That is, it is shifted down by two digits. According to this embodiment, therefore, the values measured in the modes 1, 2 and 3 are taken out after being converted into signals of 8 bits. The converted vaue representative of the number N of revolutions of the engine is set into the RAM 116, and is used for the control of the fuel system and the ignition system.

Figure 23:
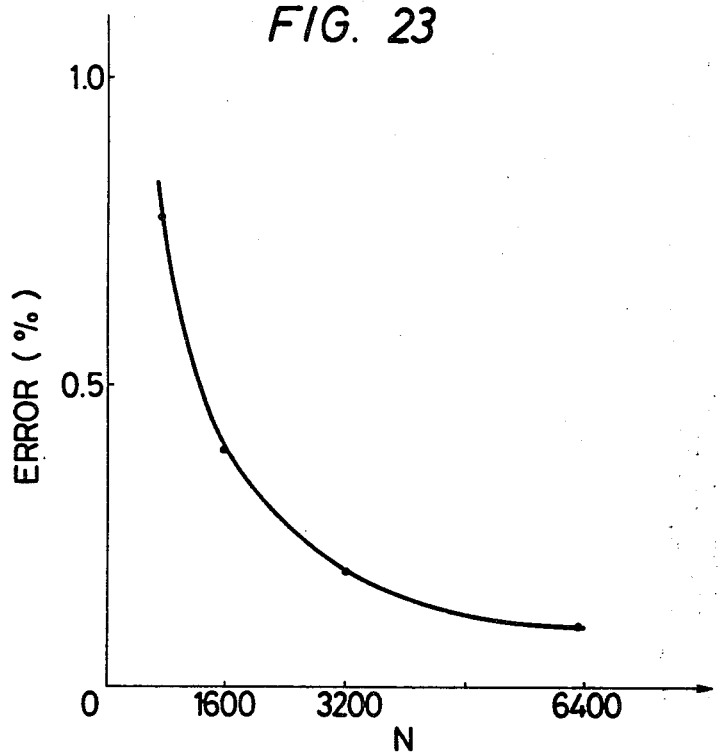
FIGS. 23 and 27 show the relationship between the number of revolutions of the engine and the relative error.
Figure 27:
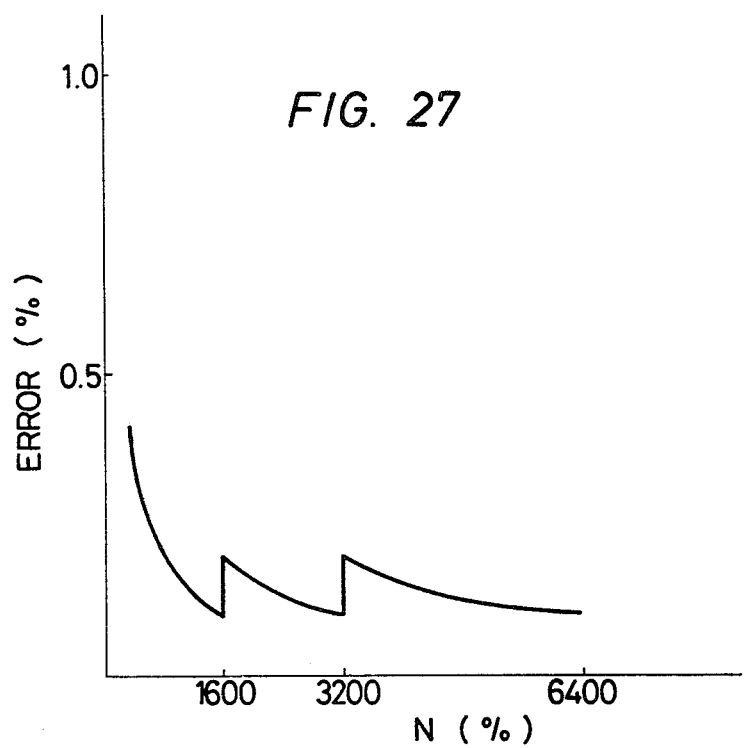

The relationship between the relative error $\epsilon$ and the number of engine revolutions in the above embodiment is illustrated in FIG. 27. It is appreciated from this figure that the number of revolutions can be measured with errors of less than 0.1–0.3% over a wide range from about 600 r.p.m. to 6400 r.p.m. On the contrary, in a case where the fixed time width is used for the measurement of revolutions, the relationship between the relative error and the number of engine revolutions is shown in FIG. 23.

It is apparent that the present invention provides high precision in the measurement of engine revolutions in comparison with the prior art. Since the computation precision of the fuel injection time, the ignition advance angle or the like is determined on the basis of the number of engine revolutions, the engine control performance according to this invention is also improved. In particular, the enhancement of the precision at low-speed revolutions is remarkable, and the control performance at idling is sharply enhanced. Further, according to the embodiment of this invention, the operation mode is changed-over every square of the number of revolutions. Therefore, the conversion of the count value at different modes into the reference scale is done by merely shifting the digit of the count value so that the processing of the conversion is very simple and quick.

(6) Detection of the Engine Stopping

When the revolutions of the engine become lower than a predetermined value, in other words, that the interval of the reference pulse INTLD becomes greater than the set value ENST REG of the register 410 of the first register file 470, the CPU 114 is informed by an interrupt signal of the fact that the engine will soon stop. In normal operation, the reference pulse INTLD is predetermined in cycle or interval to be less than the set value of the register 410. In the event the CPU 114 receives an interrupt signal indicating that the engine will stop, the CPU 114 generates an instruction signal for the stopping of the operation of the fuel pump and other necessary elementary operations.

Figure 29:
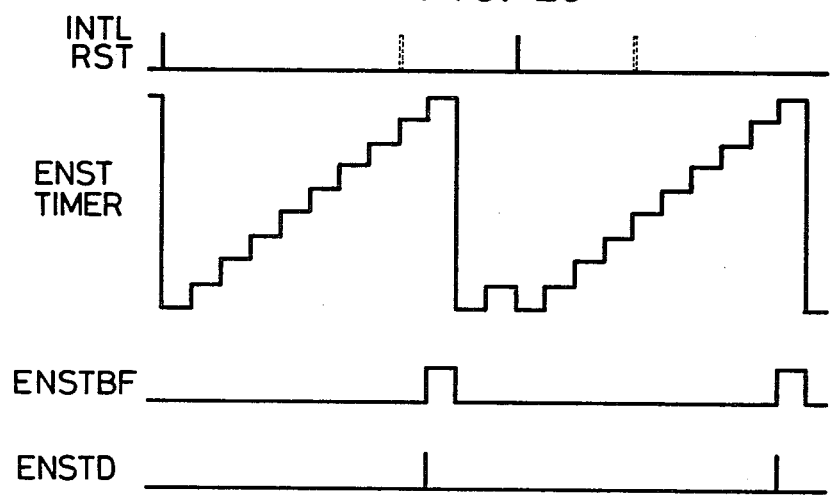

When the microstage generator 570 produces the stage pulse ENST-P, the register 410 of the first register file 470 and the timer 448 of the second register file 472 are selected for operation. At the same time, the incrementer 478 is applied with the stage pulse ENST-P as an increment control signal INC, as shown in FIG. 16(F), and a reset signal RESET produced by means of a logic circuit shown in FIG. 17(F). The timer 448 operates to count up the stage pulses ENST-P so that the count value ENST TIMER varies as shown in FIG. 29. As a consequence, a latch circuit 520 connected to the comparator through the latch circuit 518 delivers an output shown at ENSTBF in FIG. 29. By the connection of the same logic circuit 710 as in FIG. 18 to the output stage of the latch circuit 518, an output pulse ENSTD indicating the condition of the engine stop can be obtained at the terminal 712 of the logic circuit 710. In normal operation, the timer 448 is reset by a pulse INTLRST shown in FIG. 29. This pulse INTLRST is produced with the reference pulse INTLD being made in synchronism with the stage pulse ENST-P. When the engine is near the condition of stop, the timer 448 is reset by the output ENSTBF of the latch circuit 518 and the above-mentiond pulse INTLRST. The interval between the pulse INTLRST and the output pulse ENSTD is referred to as a so-called ENST time.

Since various changes in the control apparatus embodied in the present invention may be made without departing from its spirit and scope, it is intended that all matters in the above description shall be considered as illustrative and not in a limiting sense.

For example, although in the embodiment of the invention the measurement method based on the three modes of time widths has been stated, it is to be understood that the precision, especially at low speeds, can be improved by further increasing the number of modes of time widths. Also, although, in the above description, the number of engine revolutions has been exemplified, the invention can be similarly applied to the measurement of the vehicluar speed.

It should be noted that the various elements discussed above, such as the CPU 114, the RAM 116, the ROM 118, and the various registers could readily be constructed and programmed to perform the above-described operations by one of ordinary skill in the art.

We claim:

1. In an apparatus for detecting the number of revolutions of the crankshaft of an internal combustion engine including:
    a sensor for detecting a rotational angle of the engine crankshaft which generates a pulse each time the engine crankshaft rotates a fixed crank angle;
    a central processor unit for performing an arithmetic operation in accordance with a stored program to provide output data;
    a memory coupled to the central processor unit for storing the program to be executed;
    an input/output unit connected with said sensor, said central processor unit and said memory;
    said input/output unit comprising:
    a first register for storing data representative of an interval of time, which data is supplied from said central processor unit;
    a first timer for counting up pulses which are produced at fixed periods of time;
    a comparator for comparing the stored data of said first register with the count value of said first timer to produce a pulse when the count value becomes equal to or greater than the value of the stored data;
    a first counter for counting up the pulses produced by means of said sensor, said first counter being reset in response to the pulse deleivered from said comparator; and
    wherein said central processing unit includes control means for changing the data to be set into said first register in accordance with a preceding count value of said first counter.

2. An apparatus for detecting the number of revolutions of the crankshaft of an internal combustion engine as defined in claim 1, which further comprises a second register connected with said first counter to receive the count value thereof, and means for transferring the received value of said second register to the central processor unit.

3. An apparatus for detecting the number of revolutions of the crankshaft of an internal combustion engine as defined in claim 1, wherein the value of the data set into the first register from the control means is determined such that the value of the data is increased when a present count value of the first counter becomes smaller than an immediately preceding count value thereof.

4. An apparatus for detecting the number of revolutions of the crankshaft of an internal combustion engine comprising:
    a sensor for detecting a rotational angle of the engine crankshaft, which generates a pulse each time the engine crankshaft rotates a fixed crank angle;
    a central processor unit for performing an arithmetic operation in accordance with a stored program, said processor unit providing first data indicative of a first interval of time, second data indicative of a second interval of time, and third data indicative of a third interval of time, wherein the first interval of time is greater than the second interval of time, and the second interval of time is greater than the third interval of time;

a memory coupled to the central processor unit for storing the program to be executed;

a first register for storing data selected from said first, second and third data;

a first timer for counting up clock pulses;

a comparator for comparing the stored data of said first register with the count value of said first timer to produce a pulse when the count value becomes equal to or greater than the value of the stored data;

a first counter for counting up the pulses produced by means of said sensor, said first counter being reset in response to the pulse delivered from said comparator; and a second register connected with said first counter to receive the count value thereof, the contents of said second register being transferred to the central processor unit which performs an operation for comparing the transferred data with a preceding count value of said first counter to produce an output to determine which of the first, second and third data to be supplied to said first register is selected.

5. An apparatus for detecting the number of revolutions of the crankshaft of an internal combustion engine as defined in claim 4, wherein a present count value and a preceding count value are respectively compared with predetermined values to detect an overflow of said first counter.

6. An apparatus for detecting the number of revolutions of the crankshaft of an internal combustion engine as defined in claim 5, wherein either one of the second and third data is set into the first register when the over-flow of said first counter occurs.

7. An apparatus for detecting the number of revolutions of the crankshaft of an internal combustion engine as defined in claim 4, wherein means is provided to obtain the number of revolutions by dividing the count value of the first counter by a value which is determined on the basis of the data having been set into the first register.

8. In an electronic control apparatus for detecting the speed of a first member moving relative to a second member comprising:

sensor means, coupled with said first and second members, for generating an output pulse for a prescribed displacement of said first and second members relative to each other;

a data processing unit for carrying out data processing operations and providing output data; and an input/output unit coupled with said sensor means and said data processing unit;

said input/output unit comprising:

first means, coupled to said sensor means, for storing a first code, the value of which is modified in response to output pulses generated by said sensor means during a prescribed period of time; and second means for controlling the duration of said prescribed period of time in response to output data provided by said data processing unit, said second means including means for storing a second code, the value of which is modified of a preselected rate, and means for generating an output signal, representative of said prescribed period of time during which the value of the first code stored by said fist means is modified, in response to the value of said second reaching a predetermined value.

9. An electronic control apparatus according to claim 8, wherein said second means further includes means, coupled to said data processng unit, for storing output data representative of said predetermined value provided by said data processing unit, and wherein said output signal generating means includes means for comparing said second code with said output data and generating said output signal in response to the value of said second code corresponding to the value of said output data.

10. An electronic control apparatus according to claim 8, wherein said second means further includes means for generating a series of timing pulses at said preselected rate and selectively modifying the value of said second code in response thereto.

11. An electronic control apparatus according to claim 9, wherein said second means further includes means for generating a series of timing pulses at said preselected rate and causing said second code and said output data to be applied to said comparing means in response thereto.

12. An electronic control apparatus according to claim 11, wherein said second means further includes means for selectively modifying the value of said second code by said timing pulses in dependence upon the generation of an output signal by said comparing means.

13. An electronic control apparatus according to claim 8, wherein said first member comprises the crankshaft of an internal combustion engine and said second member comprises means for locating said sensor means at a position to measure rotational displacement of said crankshaft.

14. An electronic control apparatus according to claim 8, wherein said first member comprises a portion of the wheel/axle structure of a vehicle and said second member comprises means for locating said sensor means at a position to measure rotational displacement of said portion of the wheel/axle structure.

15. An electronic control apparatus according to claim 9, wherein said first means further includes means for coupling said first code to said data processing unit in response to the generation of said output signal by said comparing means.

16. A method of operating an electronic control apparatus so as to determine the speed of a first member relative to a second member, said apparatus having sensor means, coupled with said first and second members, for generating an output pulse for a prescribed displacement of said first and second members relative to each other, a data processing unit for carrying out data processing operations and providing output data, and an input/output unit coupled with said sensor means and said data processor unit, said input/output unit containing first means, coupled to said sensor means, for storing a first code, the value of which is modified by output pulses generated by said sensor means during a prescribed period of time, and second means for controlling the duration of said prescribed period of time in response to output data provided by said data processing unit, said method comprising the steps of:

storing said first code in said first means, whereby the value of said first code is modified by said output pulses generated by said sensor means during said prescribed period of time;

converting the value of said first code having been modified during said prescribed period of time into data indicative of said speed in dependence upon the duration of said prescribed period of time within which said first code has been modified by said output pulses; and coupling to said data processing unit the converted value of said first code.

17. A method according to claim 16, wherein said converting step comprises the step of dividing the value of said first code by a number, the value of which is dependent upon the duration of said prescribed period of time.

18. A method according to claim 16, wherein said first code is a digital code and said converting step comprises the step of shifting the bits of said first code by a number of bit positions dependent upon the duration of said prescribed period of time.

19. A method according to claim 18, wherein the bit capacity of said first means differs from that of a storage location in said data processing unit to which said converted value of said first code is coupled and wherein said converting step comprises the step of shifting the bits of said first code by a number of bit positions to make the bit size of the converted code compatible with the bit capacity of said storage location.

20. A method according to claim 16, further comprising, prior to said converting step, the steps of
detecting whether or not the value of said first code is equal to or greater than a first prescribed value, and
upon the value of said first code having been detected to be equal to or greater than said first prescribed value, carrying out said converting step.

21. A method according to claim 20, wherein said first means comprises a register, the contents of which are successively incremented in response to said output pulses generated by said sensor means during said prescribed period of time, and wherein said method further comprises the step of detecting whether or not the contents of said register have been caused to overflow in response to said output pulses during said prescribed period of time, in response to the value of said first code having been detected to be less than said prescribed value.

22. A method according to claim 21, further comprising the step of causing said second means to change the duration of said prescribed period of time in response to detecting that the contents of said register have been caused to overflow.

23. A method according to claim 22, wherein said duration of time changing step comprises the step of reducing the interval of said prescribed period of time during which the contents of said register are incremented in response to said output pulses.

24. A method according to claim 20, wherein said overflow detecting step comprises the steps of
detecting whether or not the contents of said register are less than a second prescribed value which is less than said first prescribed value, and
upon detecting that the contents of said register are less than said second prescribed value, detecting whether or not the previous value of said first code that has been coupled to said data processing unit exceeds a third prescribed value.

25. A method according to claim 24, further comprising the step of causing said second means to change the duration of said prescribed period of time in response to detecting that said previous value of said first code exceeds said third prescribed value.

26. A method according to claim 25, wherein said duration of time changing step comprises the step of reducing the interval of said prescribed period of time during which the contents of said register are incremented in response to said output pulses.

27. A method according to claim 24, further comprising the steps of
detecting whether or not the rate of displacement of said first and second members relative to each other is decreasing, and
upon detecting that said rate of displacement is not decreasing, carrying out said converting step.

28. A method according to claim 24, further comprising the steps of
detecting whether or not the rate of displacement of said first and second members relative to each other is decreasing, and upon detecting that said rate of displacement is decreasing, detecting whether or not the duration of said prescribed period of time corresponds to a first preselected duration.

29. A method according to claim 28, further comprising the steps of
multiplying the value of said first code by a prescribed factor and reducing the interval of said prescribed period of time during which the contents of said register are incremented in response to said output pulses.

30. A method according to claim 29, wherein said decreasing rate of displacement detecting step comprises the step of detecting whether or not the previous value of said first code is equal to or greater than said first prescribed value.

31. A method according to claim 16, wherein said first member comprises the crankshaft of an internal combustion engine and said second member comprises means for locating said sensor means at a position to meausre rotational displacement of said crankshaft.

32. A method according to claim 16, wherein said first member comprises a portion of the wheel/axle structure of a vehicle and said second member comprises means for locating said sensor means at a position to measure rotational displacement of said portion of the wheel/axle structure.

33. A method according to claim 16, further comprising, prior to said converting step, the step of detecting that a preselected period of time has elapsed subsequent to a previous change in the duration of said prescribed period of time by said second means.

34. A method according to claim 20, further comprising, prior to said detecting step, the step of detecting that a preselected period of time has elapsed subsequent to a previous change in the duration of said prescribed period of time by said second means.

35. In a control apparatus for an internal combustion engine for use in a vehicle having:
sensor means for producing signals representative of operating conditions of said engine including at least one of engine speed and vehicle speed;
actuator means for controlling respective energy conversion functions of said engine in response to control signals applied thereto;
an input/output unit coupled to receive signals produced by said sensor means and to deliver control signals to said actuator means, and
a data processing unit, coupled to said input/output unit, for carrying out engine control data processing operations in accordance with signals produced by said sensor means and thereby generating engine control codes that are coupled to said input/outut unit;

the improvement wherein said input/output unit comprises:

first means for generating an engine control timing signal pattern through which operational events of said engine are controlled;

second means, coupled to said data processing unit, for storing said engine control codes;

third means, coupled to said first means, for generating respective engine timing codes the values of which are selectively modified by said engine control timing pattern;

fourth means, coupled to said second and third means, for comparing respective ones of said engine control codes with respective ones of said engine timing codes and producing respective output signals when said respective engine control codes define a prescribed relationship with respect to said engine timing codes; and fifth means, coupled to said fourth means, for producing control signals to be coupled to said actuator means in response to the output signals produced by said fourth means; and wherein said second means includes means for storing a first engine control code representative of a prescribed period of time during which one of said engine speed and vehicle speed is measured in response to signals produced by a respective one of said sensor means; and said third means includes means for generating a first engine timing code, the value of which is modified in response to the generation of signals produced by said respective one of said sensor means during said prescribed period of time, the value of said first engine timing code at the end of said prescribed period of time being representative of said one of said engine speed and vehicle speed.

36. A control apparatus according to claim 35, wherein said third means further includes means for generating a second engine timing code, the value of which is modified by said engine control timing signal pattern, said fourth means producing a first output signal in response to the value of said second engine timing code defining said prescribed relationship with respect to said first engine control code, and wherein said input/outut unit further includes sixth means, coupled to said third means, for storing the value of said first engine timing code in response to said first output signal from said fourth means.

37. A control apparatus according to claim 36, wherein said sixth means is coupled to said data processing unit for supplying thereto the value of said first engine timing code.

* * * * *